US009495172B2

(12) United States Patent
Moriki et al.

(10) Patent No.: US 9,495,172 B2
(45) Date of Patent: Nov. 15, 2016

(54) METHOD OF CONTROLLING COMPUTER SYSTEM AND COMPUTER SYSTEM

(71) Applicant: Hitachi, Ltd., Tokyo (JP)

(72) Inventors: Toshiomi Moriki, Tokyo (JP); Takayuki Imada, Tokyo (JP); Naoya Hattori, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 396 days.

(21) Appl. No.: 14/252,805

(22) Filed: Apr. 15, 2014

(65) Prior Publication Data

US 2014/0359267 A1 Dec. 4, 2014

(30) Foreign Application Priority Data

May 31, 2013 (JP) ................................. 2013-115614

(51) Int. Cl.
*G06F 9/44* (2006.01)
*G06F 9/455* (2006.01)

(52) U.S. Cl.
CPC ............. *G06F 9/441* (2013.01); *G06F 9/4405* (2013.01); *G06F 9/45533* (2013.01)

(58) Field of Classification Search
None
See application file for complete search history.

(56) References Cited

U.S. PATENT DOCUMENTS

| 6,772,419 | B1 | 8/2004 | Sekiguchi et al. |
| 7,979,863 | B2 | 7/2011 | Esfahany et al. |
| 2011/0161541 | A1 | 6/2011 | Madukkarumukumana et al. |
| 2014/0351809 | A1* | 11/2014 | Chawla ............... G06F 9/45533 718/1 |

FOREIGN PATENT DOCUMENTS

JP 11-149385 A 6/1999

OTHER PUBLICATIONS

Intel 64 and IA-32 Architectures Software Developer's Manual, vol. 3C: System Programming Guide, Part 3, Jun. 2013.

* cited by examiner

*Primary Examiner* — Paul Yanchus, III
*Assistant Examiner* — Joshua Neveln
(74) *Attorney, Agent, or Firm* — Mattingly & Malur, PC

(57) ABSTRACT

A computer system with a plurality of processors having a hardware-assisted virtualization and a memory, the computer system including a first processor group of the processors having hardware-assisted virtualization set disabled, and a second processor group of the processors and having hardware-assisted virtualization set enabled, the method having: booting a first OS by assigning the first processor group to the first OS; booting a virtual machine monitor to boot a virtual machine by assigning the second processor group to the virtual machine monitor; performed by the virtual machine monitor, booting a second OS by assigning a certain area of the memory to the second OS; and performed by the virtual machine monitor, setting a data path through which the first OS and second OS communicate with each other, the data path being set in the memory.

14 Claims, 22 Drawing Sheets

211 LIST OF MEMORY AREAS AND ACCESSIBILITIES OF PROGRAMS;
(OK: ACCESSIBLE, NG: INACCESSIBLE)

| AREA NAME | 105 FILE SERVER OS | 106 VMM | 108 BLOCK CONTROL MICROPROGRAM |
|---|---|---|---|
| USER AREA | ○ | ○ | ○ |
| SUPERVISOR AREA | × | ○ | ○ |
| VMM PRIVATE AREA | × | ○ | ○ |
| BLOCK CONTROL MICROPROGRAM PRIVATE AREA | × | × | ○ |

| PHYSICAL CPU CORE NUMBER (APIC ID) | 0 | 1 | 2 | 3 | 4 | 5 | 6 | 7 |
|---|---|---|---|---|---|---|---|---|
| VMX SETTING | 0(OFF) | 0 | 0 | 0 | 1(ON) | 1 | 1 | 1 |
| ASSIGNED TO | BLOCK CONTROL MICROPROGRAM | ↓ | ↓ | ↓ | VMM | ↓ | ↓ | ↓ |
| GUEST PROGRAM | - (d/c) | - | - | - | FILE SERVER OS | ↓ | ↓ | ↓ |

401 CPU ASSIGNMENT MANAGEMENT TABLE 4011 4012 4013 4014

*Fig. 4A*

402 MEMORY ASSIGNMENT MANAGEMENT TABLE

| PHYSICAL MEMORY RANGE (specified by host physical address) | 0 – 16GB | 16 – 18GB | 18 – 32GB |
|---|---|---|---|
| ASSIGNED TO | BLOCK CONTROL MICROPROGRAM | VMM | FILE SERVER OS |

403 I/O ASSIGNMENT MANAGEMENT TABLE

| I/O DEVICE | 118 NIC | 119 TA | 120b HBA |
|---|---|---|---|
| ASSIGNED TO | VMM | BLOCK CONTROL MICROPROGRAM | BLOCK CONTROL MICROPROGRAM |
| GUEST PROGRAM | FILE SERVER OS | - (d/c) | - (d/c) |

133 CONTROL TABLE OF COMMUNICATION DATA PATH

| BYTE OFFSET | SIZE | FIELD NAME | MEANING | SETTER |
|---|---|---|---|---|
| 0 | 4 | Revision | INDICATE REVISION NUMBER OF CURRENT STRUCTURE | BLOCK CONTROL MICROPROGRAM |
| 4 | 4 | Max number of HBA device | SPECIFY MAXIMUM NUMBER OF VHBA DEVICES SUPPORTED BY BLOCK CONTROL MICROPROGRAM | BLOCK CONTROL MICROPROGRAM |
| 8 | 4 | vHBAdevice POST | INDICATE INITIALIZATION STATUS OF VHBA DEVICE: "0" IF UNINITIALIZED, AND "1" IF SERVICE IS STARTED | VMM |
| 12 | 4 | block Acknowledge | INDICATE RECOGNITION BY BLOCK CONTROL MICROPROGRAM WHILE FOLLOWING PROGRESS OF POST CODE | BLOCK CONTROL MICROPROGRAM |
| 16 | 8 | (i) PCI configuration register location | SPECIFY LOCATION OF PCI CONFIGURATION REGISTER OF ZEROTH VHBA DEVICE AND RESULTANT ADDRESS BECOMES HOST PHYSICAL ADDRESS | VMM |
| 24 | 8 | (ii) BAR0 MMIO register - operational | SPECIFY LOCATION OF BAR0 MMIO REGISTER-OPERATIONAL OF ZEROTH VHBA DEVICE AND RESULTANT ADDRESS BECOMES HOST PHYSICAL ADDRESS | VMM |
| 32 | 8 | (iii) BAR1 MMIO register - MSI-X | SPECIFY LOCATION OF BAR1 MMIO REGISTER-MSI-X OF ZEROTH VHBA DEVICE AND RESULTANT ADDRESS BECOMES HOST PHYSICAL ADDRESS | VMM |
| 40 | 8 | (iv) Address Translation Information | SPECIFY LOCATION OF STRUCTURE HOLDING TRANSLATION INFORMATION (FROM GUEST PHYSICAL TO HOST PHYSICAL) ABOUT MEMORY ADDRESS OF LPAR USING ZEROTH VHBA DEVICE, AND RESULTANT ADDRESS BECOMES HOST PHYSICAL ADDRESS | VMM |

511 HEADER INFORMATION

133 CONTROL TABLE OF COMMUNICATION DATA PATH

| BYTE OFFSET | SIZE | FIELD NAME | MEANING | SETTER |
|---|---|---|---|---|
| 48 | 8 | reserved | | |
| 56 | 1 | Num of Queue-Pairs | SPECIFY MAXIMUM NUMBER OF QUEUE PAIRS (ITQ/TIQ) IN (M-1) FORMAT AVAILABLE BY ZEROTH HBA DEVICE<br><br>0 = ONLY ONE QUEUE PAIR<br>1 = UP TO TWO QUEUE PAIRS<br>...<br>31 = UP TO 32 QUEUE PAIRS<br>THIRTY TWO QUEUE PAIRS OR MORE = REVERSED | BLOCK CONTROL MICROPROGRAM |
| 57 - 63 | 7 | reserved | | |
| 8+ (k*64) | 4 | vHBA device POST | STORE INFORMATION ABOUT FIRST HBA DEVICE AND ITS SUBSEQUENT HBA DEVICE (THIS MEANING ALSO APPLIES TO THE FOLLOWING) | |
| 12+ (k*64) | 4 | block Acknowledge | | |
| 16+ (k*64) | 8 | (i) PCI configuration register location | | |
| 24+ (k*64) | 8 | (ii) BAR0 MMIO register - operational | | |
| 32+ (k*64) | 8 | (iii) BAR1 MMIO register - MSI - X | | |
| 40+ (k*64) | 8 | (iv) Address Translation Information | | |
| 48+ (k*64) | 8 | reserved | | |
| 56+ (k*64) | 1 | Num of Queue - Pairs | | |
| 57+ (k*64) | 7 | reserved | | |

591 INFORMATION ENTRY RESPONSIVE TO MULTIPLE QUEUES

Fig. 4E

129 ADDRESS TRANSLATION TABLE

| BYTE OFFSET | SIZE | FIELD NAME | MEANING | SETTER |
|---|---|---|---|---|
| 0 | 4 | Revision | INDICATE REVISION NUMBER OF CURRENT STRUCTURE | VMM |
| 4 | 4 | Num_of_Entries | INDICATE THE NUMBER OF ENTRIES OF CURRENT STRUCTURE | VMM |
| 8 | 8 | LogicalStartAddress#0 | INDICATE BEGINNING OF GUEST PHYSICAL ADDRESS RANGE AS VIEWED FROM LPAR (FILE SERVER OS) | VMM |
| 16 | 8 | Size#0 | INDICATE SIZE OF CURRENT AREA | ↑ |
| 24 | 8 | PhysicalBase#0 | INDICATE HOST PHYSICAL ADDRESS CORRESPONDING TO BEGINNING GUEST PHYSICAL ADDRESS LOGICALSTARTADDRESS#0 OF CURRENT AREA | ↑ |
| 32 | 8 | Reserved | | |
| 8+ (32*k) | 8 | LogicalStartAddress#k | SAME AS #0 AND HOLDING INFORMATION ABOUT K$^{TH}$ ENTRY | |
| 16+ (32*k) | 8 | Size#k | | |
| 24+ (32*k) | 8 | PhysicalBase#k | | |
| 32+ (32*k) | 8 | Reserved | | |

- 611 HEADER INFORMATION
- 691 ENTRY INCLUDING MULTIPLE PIECES OF ADDRESS TRANSLATION INFORMATION
- 601, 602, 603
- 1291, 1332, 1293, 1294, 1295

Fig. 4F

130 PCI Config reg.

| BYTE OFFSET | SIZE | FIELD NAME | | INITIAL VALUE | MEANING AND DESCRIPTION |
|---|---|---|---|---|---|
| 0 | 2 | Vendor ID | | 1054 | Hitachi, Ltd |
| 2 | 2 | Device ID | | 3033 | VIRTUAL HBA DEVICE |
| 4 | 2 | Command | | 0056 | I/O- Mem+ BusMaster+ SpecCycle- MemWINV+ VGASnoop- ParErr+ Stepping- SERR- FastB2B- DisINTx- |
| 6 | 2 | Status | | 0010 | Cap+ 66MHz- UDF- FastB2B- ParErr- DEVSEL=fast >TAbort- <TAbort- <MAbort- >SERR- <PERR- INTx- |
| 9 | 3 | ClassCode | | 018000 | Other mass-storage controller |
| | | | Base class | 01 | Mass-storage class |
| | | | Sub class | 80 | Other |
| | | | Program I/F | 00 | Other |
| 10 | 8 | BAR0 (64bit) | | 0xf08fc004 | Memory at f08fc000 (64-bit, non-prefetchable) [size=4K] |
| 18 | 8 | BAR1 (64bit) | | 0xf08fb004 | Memory at f08fb000 (64-bit, non-prefetchable) [size=4K] |
| 34 | 1 | Capability Ptr | | 40 | |
| 40 | 10 | MSI-X capability | | 11 50 00 00<br>02 00 00 00<br>02 08 00 00<br>00 00 00 00 | Capabilities: [40] MSI-X: Enable- Count=1 Masked- Vector table: BAR=2 offset=00000000 PBA: BAR=2 offset=00000800 |
| 50 | 10 | PCI express capability | | 10 00 02 00<br>82 8d 00 10<br>10 28 00 00<br>41 5c 03 00 | |

131a BAR0 MMIO Regs

| offset | size | name | Attr. | desc. | |
|---|---|---|---|---|---|
| 0 – 00FFh | 256Bytes | Reserved | Rsv | Reserved for PQI spec. | |
| 0100 | 32bits | Queue Structure Version | RO | Version description. | |
| 0104 | 32bits | Number of Queue-Pair sets | RO | Number of queue-pair sets supported by this vHBA device.<br>Max = 32, proto=1; | |
| 0108 | 64bits | Interrupt Cause (from block Micro) | RO | Interrupt cause bits per queue-pair. (detected errors by block Micro) | |
| 0110 | 64bits | Recent Error Code from block Micro | RO | Detailed error code describing the detail of interrupt cause(0108h).<br>Detailed Encoding is TBD. | |
| 0118 | 64bits | Error Notifier (from File OS) | RW | Error reporting bits per queue-pair. (detected errors by File OS) | |
| 0120 | 64bits | Recent Error Code from File OS | RW | Detailed error code describing the detail of error notifier(0118h).<br>Detailed Encoding is TBD. | |
| 0128 | 32bits | Queue enable request | RW | HBA queue enable request, 0= disable requested, 1= enable requested. Bit assign is following;<br>bit0 – request to #0 Q-pair.<br>other – reserved (future use) | 308 |
| 012C | 32bits | Queue status | RW | HBA queue status set by block Micro, 0= disabled, 1= enabled. Bit assign is following;<br>bit0 – status of #0 Q-pair.<br>other – reserved (future use) | 309 |
| 0130 | 32bits | Interrupt Disable | RW | Interrupt Enable bits set by File OS, 0= enabled, 0= disabled. Bit assign is following;<br>bit0 – interrupt disable of #0 Q-pair.<br>other – reserved (future use) | |
| 0134–013Fh | 12Bytes | Reserved | Rsv | Reserved for future use. | 321a REQUEST BASE |
| 0140h | 64bits | ITQ#0 base addr | RW (*1) | Operation Queue/ ITQ base. | 1601 |
| 0148h | 64bits | ITQ#0 length | | Counts by bytes. | 310a, 310b |
| 0150h | 32+32bits | ITQ#0 PI/CI value. | | PI/CI values (32bit each.) | |
| 0158h | 64bits | Reserved | | Reserved for future use. | 321b |
| 0160h | 64bits | TIQ#0 base addr | | Operation Queue/ TIQ base. | 1602 |
| 0168h | 64bits | TIQ#0 length | | Counts by bytes. | |
| 0170h | 32+32bits | TIQ#0 PI/CI value. | | PI/CI values (32bit each.) | |
| 0178h | 64bits | Reserved | | Reserved for future use. | |
| 0180 - | 32Bytes*n | Reserved | | Future use for ITQ/TIQ#1, #2, to #n-1. | 311a, 311b |

125 REQUEST RING BUFFER

| Bit / Byte | 7 | 6 | 5 | 4 | 3 | 2 | 1 | 0 |
|---|---|---|---|---|---|---|---|---|
| 0 | IU TYPE (11h) | | | | | | | |
| 1 | COMPATIBLE FEATURES(00h) | | | | | | | |
| 2 | (MSB) | | | IU LENGTH(n-3) | | | | (LSB) |
| 3 | | | | | | | | |
| 4 ... 7 | QUEUING INTERFACE SPECIFIC | | | | | | | |
| 8 / 9 | REQUEST IDENTIFIER | | | | | | | |
| 10 / 11 | NEXUS IDENTIFIER | | | | | | | |
| 12 ... 15 | (MSB) | | | DATA BUFFER SIZE | | | | (LSB) |
| 16 ... 23 | LOGICAL UNIT NUMBER | | | | | | | |
| 24 / 25 | PROTOCOL SPECIFIC | | | | | | | |
| 26 | colspan 5: Reserved | | | | | PARTIAL | colspan 2: DATA DIRECTION | |
| 27 ... 29 | Reserved | | | | | | | |
| 30 | Reserved | colspan 3: COMMAND PRIORITY | | | colspan 4: TASK ATTRIBUTE | | | |
| 31 | colspan 3: Reserved | | | colspan 3: ADDITIONAL CDB BYTE USAGE | | | colspan 2: Reserved | |
| 32 ... 47 | CDB | | | | | | | |
| 48 ... 63 | ADDITIONAL CDB BYTES | | | | | | | |
| 64 ... n | Data Buffer descriptor area (if any) | | | | | | | |

304 (CDB area)
303 (Data Buffer descriptor area)

*Fig. 9A*

126 RESPONSE RING BUFFER

| Bit / Byte | 7 | 6 | 5 | 4 | 3 | 2 | 1 | 0 |
|---|---|---|---|---|---|---|---|---|
| 0 | colspan=8 | IU TYPE (91h) ||||||||
| 1 | colspan=8 | COMPATIBLE FEATURES(00h) ||||||||
| 2 | colspan=8 | IU LENGTH(n-3)  (LSB) ||||||||
| 3 | (MSB) |||||||  |
| 4 |  |  |  |  |  |  |  |  |
| ... | colspan=8 | QUEUING INTERFACE SPECIFIC ||||||||
| 7 |  |  |  |  |  |  |  |  |
| 8 | colspan=8 | REQUEST IDENTIFIER ||||||||
| 9 |  |  |  |  |  |  |  |  |
| 10 | colspan=8 | NEXUS IDENTIFIER ||||||||
| 11 |  |  |  |  |  |  |  |  |
| 12 | colspan=8 | DATA-IN TRANSFER RESULT ||||||||
| 13 | colspan=8 | DATA-OUT TRANSFER RESULT ||||||||
| 14 |  |  |  |  |  |  |  |  |
| ... | colspan=8 | Reserved ||||||||
| 16 |  |  |  |  |  |  |  |  |
| 17 | colspan=8 | STATUS ||||||||
| 18 | colspan=8 | STATUS QUALIFIER ||||||||
| 19 |  |  |  |  |  |  |  |  |
| 20 | colspan=8 | SENSE DATA LENGTH(p)  (LSB) ||||||||
| 21 | (MSB) |||||||  |
| 22 | colspan=8 | RESPONSE DATA LENGTH(m)  (LSB) ||||||||
| 23 | (MSB) |||||||  |
| 24 |  |  |  |  |  |  |  | (LSB) |
| ... | colspan=8 | DATA-IN TRANSFERED ||||||||
| 27 | (MSB) |||||||  |
| 28 |  |  |  |  |  |  |  | (LSB) |
| ... | colspan=8 | DATA-OUT TRANSFERED ||||||||
| 31 | (MSB) |||||||  |
| 32 |  |  |  |  |  |  |  |  |
| ... | colspan=8 | RESPONSE DATA ||||||||
| m+31 |  |  |  |  |  |  |  |  |
| m+32 | colspan=8 | SENSE DATA ||||||||
| ... |  |  |  |  |  |  |  |  |

305 (bracket around bytes 12–19)

Fig. 9B

METHOD OF CONTROLLING COMPUTER SYSTEM AND COMPUTER SYSTEM

CLAIM OF PRIORITY

The present application claims priority from Japanese patent application JP 2013-115614 filed on May 31, 2013, the content of which is hereby incorporated by reference into this application.

BACKGROUND

This invention relates to a communication technique employed to execute multiple OSs using virtualization software in a computer with a multicore CPU or having a multi processor configuration.

In response to finer semiconductor process, a trend toward mounting multiple processor cores on a single LSI to achieve multiple cores has been promoted mainly in x86 servers. In the case of a server with a two-socket CPU, for example, 8 cores by 2 cores=16 cores are available in a single SMP system.

In order to use a large number of CPU cores efficiently, virtualization software is generally used to divide a single SMP and a single computer resource into multiple logical partitions (see US Patent Application Publication No. 2011/0161541, for example). The virtualization software manages association between a physical CPU core and a logical partition, and makes OSs run independently in corresponding logical partitions, thereby achieving effective use of a CPU core that cannot be used completely by a single OS.

A dedicated assist function realized by a CPU is indispensable for operation of the virtualization software. A CPU recently available from Intel Corporation has a dedicated assist function (hardware-assisted virtualization) intended to support management of a physical resource by the virtualization software. This function is known for example as VT-x (virtualization technology for Xeon) (see Intel 64 and IA-32 Architectures Software Developer's Manual Volume 3C: System Programming Guide, Part 3, for example). Extended page table (EPT) can be used as an example of the hardware-assisted virtualization. Extended page table is a control data structure specified by the virtualization software and is provided in addition to a general page table specified by an OS in a logical partition. EPT defines a physical memory range to be provided to a logical partition. This assist function allows OSs in a plurality of logical partitions to specify physical memory areas that do not overlap each other in making access to a memory, thereby achieving virtualization of a server safely and efficiently.

In order to make EPT enable, virtualization software such as a hypervisor switches a CPU to a mode where virtualization is enable. In the case of an x86 CPU, an order for VMX ON or VMX OFF is used for switching the mode. In the below, a status where virtualization is enable is called a VMX ON mode, and a status where virtualization is disable is called a VMX OFF mode.

The virtualization software has conventionally been used mainly in a server computer to make a general-purpose computer or run a business application. Meanwhile, an x86 CPU has been mounted on more devices in recent years such as storage systems not functioning as server devices.

A storage system is an IT device dedicated to data storage with a large number of built-in hard disks (HDDs) or semiconductor disk drives. The storage system is roughly divided into a "block-dedicated machine" coupled to an SAN (storage area network) and makes access to HDDs in units of sectors, and a "file-dedicated machine" coupled to a LAN (local area network) and manages data in units of files.

Conventionally, these types of storage system s have formed different markets according to coupling interfaces (I/Fs). Meanwhile, in response to higher hardware performance and progress of commoditization of hardware, a unified-type storage system (hereinafter called a unified storage system) having both an SAN I/F and a LAN I/F is gaining a high profile.

The following two means are known to achieve the unified storage system:

(1) Packaging type: A file-dedicated machine and a block-dedicated are housed in the same casing and are coupled through a cable for storage access such as Fibre Channel.

(2) Virtualization software type: One hypervisor is made to run in a single SMP. A block function (block control microprogram or block micro) is performed in one logical partition, whereas a file function (file server OS) is performed in a different logical partition. A block and a file are coupled through a communication path used for coupling between logical partitions and represented by virtio, for example. There has been a known technique described for example in patent literature (see, for example, Japanese Patent Application Laid-open No. Hei 11-149385) that makes one software execute multiple OSs simultaneously.

A unified device of the packaging type realized by the means (1) involves twice as much hardware resources: a hardware resource for a block-dedicated machine and for a file-dedicated machine, leading to cost increase. Meanwhile, the means (2) achieves high use efficiency of a CPU and a memory, so that it achieves high cost performance.

SUMMARY

The block-dedicated machine has been used as a backend for example for a database server required to achieve a high throughput and a short response time. Accordingly, the block-dedicated machine tends to be required to achieve high-level performance. Hence, if the unified storage system is realized by the aforementioned means (2) of the virtualization software type, performance degradation caused by making a virtualization mode enable might become not negligible. In the case of EPT, for example, solving one page table mistake in the VMX OFF mode involves scanning of a four-stage table at the most, whereas it involves scanning of as much as 4×4=16 tables at the worst, leading to the problem of performance degradation.

If the unified storage system is realized by the aforementioned means (2) of the virtualization software type, the file function accesses a storage medium such as a disk drive through the block function. A file server OS providing the file function runs on the virtualization software. Meanwhile, the block control microprogram (hereinafter called a block OS) providing the block function runs on hardware corresponding to the virtualization software. The file server OS should transmit and receive data to and from the block OS for accessing the disk drive. However, according to the conventional technique, each time the file server OS accesses the disk drive, it should transmit and receive data to and from the block OS through the virtualization software. Hence, process by the virtualization software becomes overhead, resulting in a problem in that the file server OS cannot use the high-speed block function effectively.

This invention has been made in view of the aforementioned problems. It is an object of this invention to provide a technique of suppressing performance degradation of a unified storage system with a block function and a file function that are unified using virtualization software on hardware including a processor with multiple cores.

ADVANTAGEOUS EFFECTS OF INVENTION

A representative aspect of this invention is as follows. A method of controlling a computer system with a plurality of processors having a hardware-assisted virtualization and a memory, the computer system comprising a first processor group of the processors having hardware-assisted virtualization set disabled among the plurality of processors, and a second processor group of the processors and having hardware-assisted virtualization set enabled among the plurality of processors, the method comprising: a first step of booting a first OS by assigning the first processor group to the first OS; a second step of booting a virtual machine monitor to boot a virtual machine by assigning the second processor group to the virtual machine monitor; a third step performed by the virtual machine monitor, the third step booting a second OS by assigning a certain area of the memory to the second OS; and a fourth step performed by the virtual machine monitor, the fourth step setting a data path through which the first OS and second OS communicate with each other, the data path being set in the memory.

Accordingly, this invention allows the first OS (such as a block function) and the second OS (such as a file function) to communicate with each other at high speed through the data path in the memory.

BRIEF DESCRIPTION OF THE DRAWINGS

FIG. 2B shows the embodiment of this invention, and is the address space in the memory resource and access authority for each program.

FIG. 4A shows the embodiment of this invention, and is an example of the CPU assignment management table managed by the block control microprogram.

FIG. 4B shows the embodiment of this invention, and is an example of the memory assignment management table managed by the block control microprogram.

FIG. 4C shows the embodiment of this invention, and is an example of the I/O assignment management table managed by the block control microprogram.

FIG. 4D shows the embodiment of this invention, and corresponds to the first half of a diagram showing an example of the control table of communication data path managed by the VMM.

FIG. 4E shows the embodiment of this invention, and corresponds to the second half of a diagram showing an example of the control table of communication data path managed by the VMM.

FIG. 4F shows the embodiment of this invention, and is an example of the address translation table managed by the VMM.

FIG. 8A shows the embodiment of this invention, and is an example of the PCI configuration register.

FIG. 8B shows the embodiment of this invention, and is an example of the MMIO register.

FIG. 9A shows the embodiment of this invention, and is an example of an entry data format for the request ring buffer.

FIG. 9B shows the embodiment of this invention, and is an example of an entry data format for the response ring buffer.

DETAILED DESCRIPTION OF THE PREFERRED EMBODIMENTS

An embodiment of this invention is described below based on the accompanying drawings.

Figure 1:
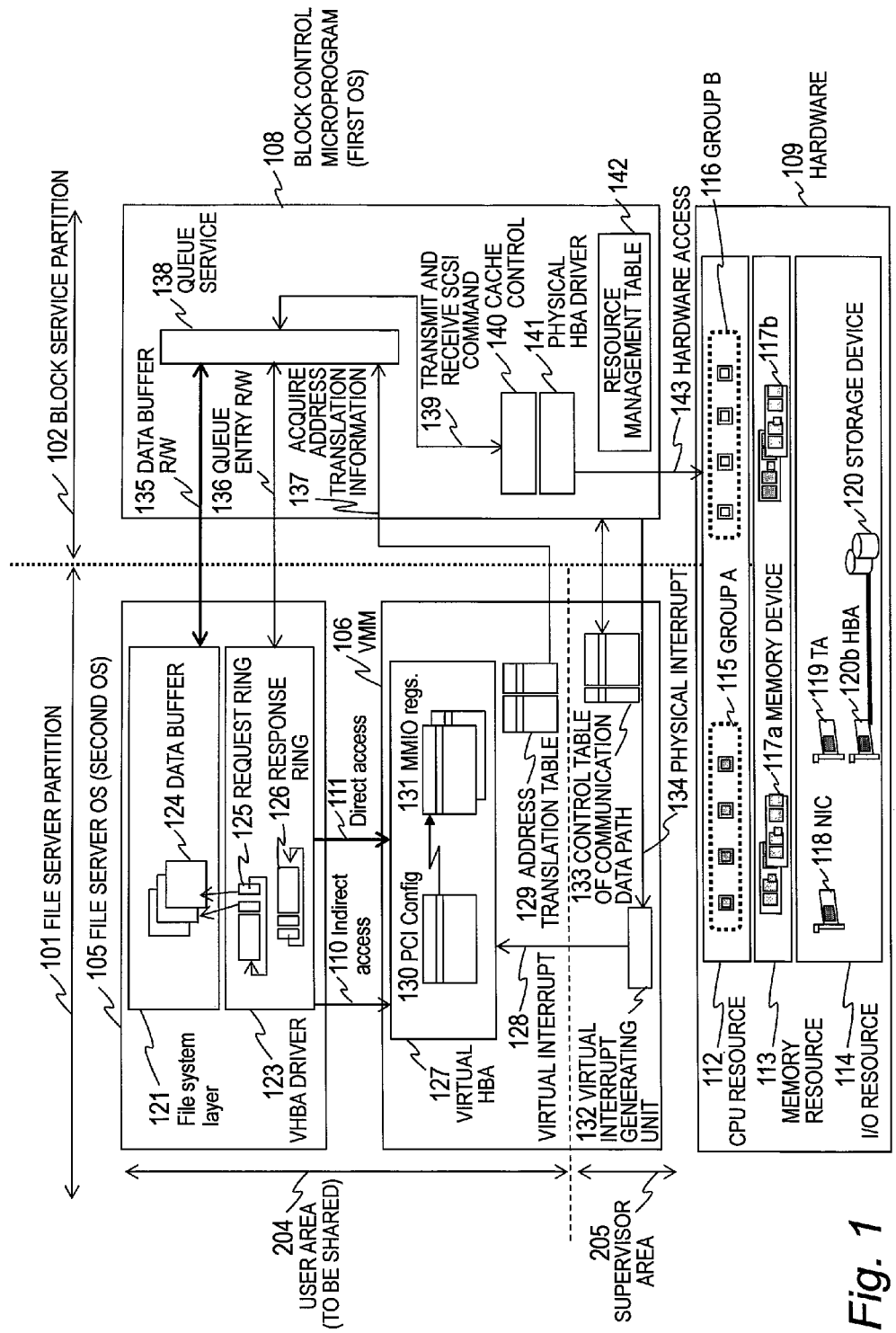
FIG. 1 shows an embodiment of this invention, and is a block diagram showing an example of a storage system with a file function and a block function that are unified on one hardware with a multicore processor.

FIG. 1 shows an embodiment of this invention. FIG. 1 is a block diagram showing an example of a storage system with a file function and a block function that are unified on one hardware with a multicore processor.

In the example of the storage system described in this embodiment, a file server OS (hereinafter called a file OS) runs as a guest OS (or virtual machine) on virtualization software and a block control microprogram (block function) runs independently on hardware corresponding to the virtualization software, thereby providing the file function and the block function.

Hardware 109 includes a multicore CPU resource 112 with the aforementioned virtualization assist function, a memory resource 113, and an I/O resource 114 to make communication and transmission and receipt of data.

The CPU resource 112 is classified into a group A115 of cores where the hardware-assisted virtualization is set enable (VMX ON), and a group B116 of cores where the hardware-assisted virtualization is set disable (VMX OFF).

In the group A115 where the hardware-assisted virtualization is enable, a file server OS 105 (second OS) is executed as a guest OS on the virtualization software. In the group B116 where the hardware-assisted virtualization is disable, a block control microprogram (first OS) 108 is executed.

The memory resource 113 includes multiple memory devices 117a and multiple memory devices 117b and provides physical address space.

The I/O resource 114 includes an NIC 118 to communicate with a computer (not shown in the drawings) through a network (not shown in the drawings), a TA (target adapter) 119 to communicate with a computer (not shown in the drawings) through an SAN (storage area network), a storage device 120 to store data and a program, and an HBA (host bus adaptor) 120b for access to the storage device 120. The block control microprogram 108 always issues a request (command) directed to the storage device 120 through the HBA 120b. Input and output devices conforming to specifications for PCI (peripheral component interfaces) are assumed as the NIC 118, the TA 119, and the HBA 120b.

A VMM (virtual machine manager) 106 is executed as the virtualization software in a file server partition 101 predetermined in the hardware 109. The file server OS 105 is executed on the VMM 106. The CPU resource 112 in the group A115 where the hardware-assisted virtualization is set enable is assigned to the file server partition 101.

The block control microprogram 108 is executed in a block service partition 102 predetermined in the hardware 109. The CPU 112 in the group B116 where the hardware-assisted virtualization is set disable is assigned to the block service partition 102.

The memory devices 117a of the memory resource 113 may be assigned to the file server partition 101 and the memory devices 117b of the memory resource 113 may be assigned to the block service partition 102.

A software structure of the storage system is described next. The block control microprogram 108 and the VMM 106 run independently as system software on the hardware 109.

The block control microprogram 108 runs in the predetermined block service partition 102 to control the hardware 109 directly. The block control microprogram 108 includes a resource management table 142, a physical HBA driver 141 to control the HBA 120b, a cache controller 140 to hold data and a command transmitting from and received by the physical HBA driver 141, and a queue service 138 to communicate with the file server OS 105 directly.

As described later, the resource management table 142 includes a CPU assignment management table 401 (FIG. 4A), a memory assignment management table 402 (FIG. 4B), and an I/O assignment management table 403 (FIG. 4C).

As described later, the queue service 138 receives address translation information from the VMM 106. The queue service 138 includes a data buffer R/W 135 to transfer data with a data buffer 124 of the file server OS 105, and a queue entry R/W 136 to transmit and receive information to from a request ring buffer 125 and a response ring buffer 126. The queue service 138 transmits and receives data and a command to and from the physical HBA driver 141 through the cache controller 140.

The block control microprogram 108 makes the queue service 138, the cache controller 140, and the physical HBA driver 141 process a storage control command transmitted from the file server OS 105, and issues a physical interrupt 134 intended to notify the VMM 106 to manage the file server OS 105 of completion of the storage control command.

The VMM 106 makes one or more guest OSs run in the predetermined file server partition 101. In the example shown in this embodiment, the VMM 106 makes the file server OS 105 as a guest OS run as a virtual machine. The VMM 106 assigns a resource in the file server partition 101 to the file server OS 105 to generate the virtual machine.

The VMM 106 provides the file server OS 105 with a virtual CPU (not shown in the drawings), a memory, and a virtual HBA 127. While not shown in the drawings, the VMM 106 further provides the file server OS 105 with a virtual NIC. The CPU resource 112 in the group A115 where the hardware-assisted virtualization is set ON is assigned as the virtual CPU. The memory to be assigned to the file server OS 105 is a certain storage area in the file server partition 101. The virtual HBA 127 includes a PCI configuration register 130 and an MMIO register 131.

The VMM 106 holds a control table 133 of communication data path that holds information about a communication data path used for high-speed communication between the file server OS 105 and the block control microprogram 108. The communication data path is a communication path set in the memory resource 113 and through which a data and a command or a response (access result) are to be delivered.

The VMM 106 holds an address translation table 129 in the memory resource 113 used to manage the status of the virtual HBA 127 and the location of information to be transmitted and received between the file server OS 105 and the block control microprogram 108. The VMM 106 shares the address translation table 129 with the block control microprogram 108.

The file server OS 105 to run on the VMM 106 includes a virtual HBA driver 123 (shown as vHBA driver in the drawings) to control the virtual HBA 127, and a file system layer 121 to transmit and receive data according to a file system.

The file server OS 105 accepts a file access from a client (not shown in the drawings) through a virtual NIC driver not shown in the drawings, and requests the block control microprogram 108 for this file access.

The file system layer 121 includes a data buffer 124 to hold data for which access is requested from a client and data from the block control microprogram 108.

The virtual HBA driver 123 includes the request ring buffer 125 and the response ring buffer 126 functioning as a buffer to hold data for which access is requested from a client and a command.

The VMM 106 belongs to both a supervisor area 205 and a user area 204 in the memory resource 113. The virtual HBA 127 and the address translation table 129 in the VMM 106 are located in the user area 204 that is a shared area allowing access from all the programs including the file server OS 105, the block control microprogram 108, and the VMM 106.

A virtual interrupt generating unit 132 and the control table 133 of communication data path in the VMM 106, and components of the VMM 106 except those located in the user area 204 are located in the supervisor area 205. The supervisor area 205 allows access from the block control microprogram 108 and the VMM 106 that can control the hardware 109.

The request ring buffer 125 and the response ring buffer 126 of the HBA driver 123 are also located in the user area 204 as a shared area allowing access from the block control microprogram 108 and the VMM 06.

The file server OS 105 writes a request (command) from a client and a buffer address list containing information about transfer data accompanying this request into the request ring buffer 125. The block control microprogram 108 acquires the command from the request ring buffer 125, executes the command, and accesses the storage device 120.

The response ring buffer 126 stores a response containing a result of process transmitted from the block control microprogram 108. Then, the file server OS 105 acquires the response written in the response ring buffer 126 based on a virtual interrupt 128 described later, and transfers the response to the client.

Accesses to the data buffer 124, the request ring buffer 125, and the response ring buffer 126 of the file server OS 105 are made by means of access 111 in guest physical address space described later. As described later, access to the user area 204 from the block control microprogram 108 is realized indirect access 110 by translating the guest physical address space to host physical address space using the address translation table 129.

In this embodiment, the file server OS 105 and the block control microprogram 108 communicate through a communication data path (communication path) set in the memory resource 113, thereby realizing high-speed access therebetween. More specifically, the MMIO register 131 of the virtual HBA 127 accesses the file server OS 105 without a trap, and for write into the MMIO register 131, the block control microprogram 108 makes direct polling to acquire data, thereby achieving high-speed communication.

<Outline of Software>

Figure 2A:
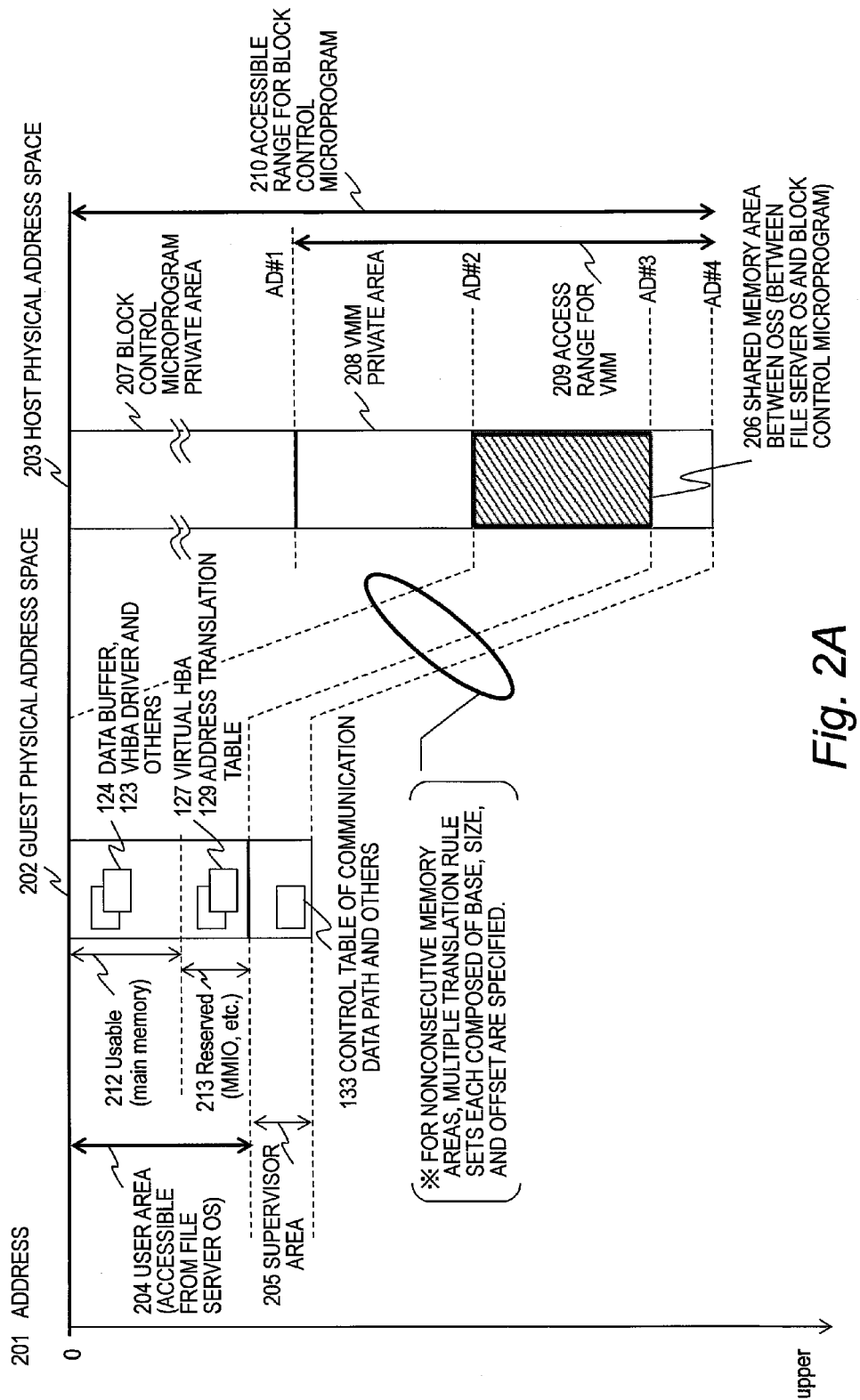
FIG. 2A shows the embodiment of this invention, and is a map showing an example of the address space in the memory resource.

FIGS. 2A and 2B each shows address space in the memory resource 113. FIG. 2A is a map showing an example of the address space in the memory resource 113. FIG. 2B shows the address space in the memory resource 113 and access authority for each program.

Areas ranging between address AD#1 and AD#4 of the memory resource 113 assigned to the block control microprogram 108 and the VMM 106 are expressed in host physical address space 203.

In this embodiment, an area ranging from address 201 at zero to certain address AD#1 is a block control microprogram private area 207 assigned to the block control microprogram 108. An area ranging from address AD#1 to address AD#4 is assigned to the VMM 106 and becomes an access range 209 for the VMM 106. An area ranging between address AD#1 and address AD#2 is a VMM private area 208 assigned to the VMM 106.

An area ranging from address AD#2 to address AD#3 is the user area 204 assigned to a guest OS of the VMM 106. In this embodiment, the user area 204 is assigned to the file server OS 105. The user area 204 functions as a shared area 206 between OSs. An area ranging from address AD#3 to address AD#4 is set as the supervisor area 205 allowing access from the block control microprogram 108 and the VMM 106.

Guest physical address space 202 ranging from address AD#2 to address AD#4 is divided into the user area 204 allowing access from all programs, and the supervisor area 205 allowing access only from the block control microprogram 108 and the VMM 106.

The user area 204 ranging from address AD#2 to address AD#3 is an address to be recognized by a guest OS, and is provided by the VMM 106 as the guest physical address space 202. In this embodiment, the file server OS 105 is assigned to the guest physical address space 202. The guest physical address space 202 is an address determined by subtracting an offset corresponding to address AD#2 in the host physical address space 203.

The user area 204 includes a usable area 212 where the file server OS 105 holds the data buffer 124 and the virtual HBA driver 123, and a reserved area 213 where the virtual HBA 127 and the address translation table 129 provided by the VMM 106 are held. The supervisor area 205 includes the control table 133 of communication data path provided by the VMM 106, and others. An address of the control table 133 of communication data path is set in the predetermined host physical address space 203. The address of the control table 133 of communication data path is also set in the block control microprogram 108.

Referring to FIG. 2B, the name of an area of a physical address is stored in column 2111. In this embodiment, a user area, a supervisor area, a VMM private area, and a block control microprogram private area are stored in corresponding entries. Being accessible or inaccessible to each area from the file server OS 105 is set in column 2112: being accessible is shown as "OK," whereas being inaccessible is shown as "NG." Being accessible or inaccessible to each area from the VMM 106 is set in column 2113: being accessible is shown as "OK," whereas being inaccessible is shown as "NG." Being accessible or inaccessible to each area from the block control microprogram 108 is set in column 2114: being accessible is shown as "OK," whereas being inaccessible is shown as "NG."

As shown in FIG. 2B, the block control microprogram 108 can access the entire host physical address space 203. Next, the VMM 106 can access the host physical address space 203 except for the block control microprogram private area 207. An access range for the file server OS 105 is limited to the user area 204. The block control microprogram 108 and the file server OS 105 transmit and receive data to and from each other directly through the user area 204.

In this embodiment, the block control microprogram 108 is downloaded first on the host physical address space 203 and is executed by the CPU resource 112 in the predetermined group B116. After being booted, the block control microprogram 108 boots the VMM 106. The VMM 106 is booted by the CPU resource 112 in the predetermined group A115. Then, the VMM 106 boots the file server OS 105 as a predetermined guest OS to generate a file server.

As described later, the VMM 106 generates the control table 133 of communication data path containing information and status about placement address of a communication data path in the supervisor area 205 in the host physical address space 203. When the control table 133 of communication data path is placed in a status where it starts to be used, the VMM 106 notifies the block control microprogram 108 of this status. In response to this notification, the block control microprogram 108 makes the VMM 106 boot the file server OS 105 and knows that communication becomes feasible.

The example of FIG. 2A shows consecutive physical addresses of a memory area assigned to each program. If physical addresses of a memory area assigned to each program are not consecutive, translation information composed of a base address, a size, and an offset address may be set in units of consecutive memory areas.

The CPU resource 112 operates according to each program, thereby operating as a functional unit to realize a certain function. As an example, the CPU resource 112 executes the block control microprogram 108 to function as a block control microprogram unit. This applies to execution of the other programs. The CPU resource 112 further operates as a functional unit to realize each of multiple processes to be performed by corresponding programs. A computer and a computer system are a device and a system including these functional units.

Information about a program, table and the like to realize each function of the storage system can be stored in a storage device such as the storage device 120, a nonvolatile semiconductor memory, a hard disk drive or an SSD (solid state drive), or a non-transitory data storage medium readable by the computer such as an IC card, an SD card, or a DVD.

<Outline of Communication Data Path>

Figure 3:
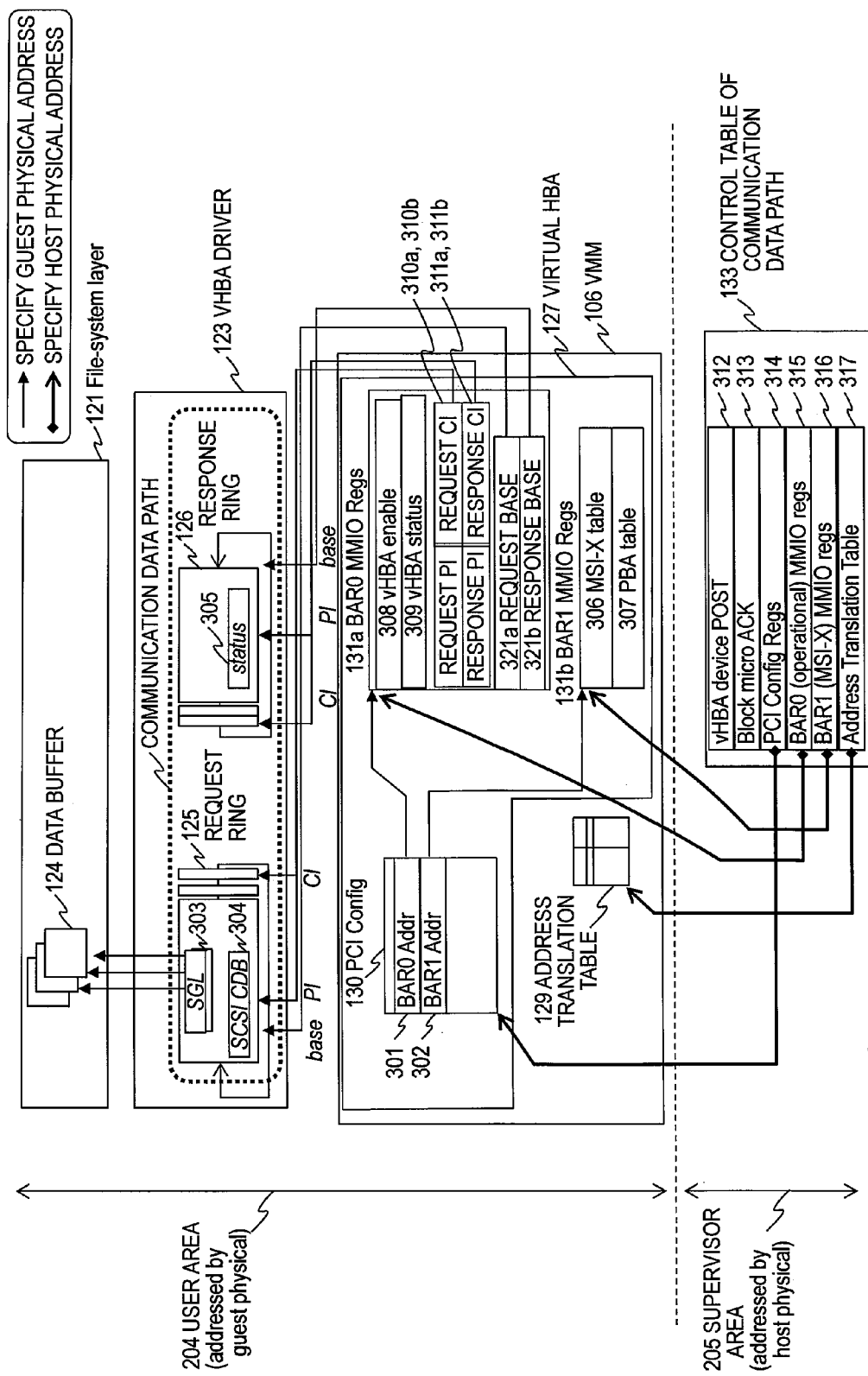
FIG. 3 shows the embodiment of this invention, and is a block diagram showing the user area and the supervisor area of the memory resource in detail.

FIG. 3 is a block diagram showing the user area 204 and the supervisor area 205 of the memory resource 113 in detail.

As shown in FIGS. 1 and 2A, the data buffer 124 of the file system layer 121, the virtual HBA driver 123, the PCI configuration register 130, the MMIO register 131, and the address translation table 129 are located in the user area 204.

The request ring buffer 125 and the response ring buffer 126 of the HBA driver 123 function as a communication data path between the file server OS 105 and the block control microprogram 108. Specifically, the request ring buffer 125 functions as a request queue and the response ring buffer 126 functions as a response queue.

The request ring buffer 125 includes an SCSI CDB (command description block) 304 to store a command (or request) directed to the storage device 120, and an SGL (scatter gather list) 303 to store a buffer address list indicating location information (data buffer 124) about data accompanying the command.

If a request (command and data) directed to the storage device 120 is accepted from a client (not shown in the drawings), the file server OS 105 stores the accepted request (command) in the SCSI CDB 304 of the request ring buffer 125. If data is accepted further, the file server OS 105 generates a buffer address list corresponding to location information about the data buffer 124 storing data, and stores the buffer address list into the SGL 303. Then, as described later, the block control microprogram 108 makes polling to read the request ring buffer 125 and executes the command directed to the storage device 120.

The response ring buffer 126 includes a status 305 to store a result of access (response) to the storage device 120. The block control microprogram 108 writes into the status 305 a location where a response or data is stored. Then, the file server OS 105 reads from the status 305 of the response ring buffer 126 a response from the storage device 120 and transmits the response to the client.

The structure of the request ring buffer 125 and that of the response ring buffer 126 are described next. The request ring buffer 125 includes a request PI (producer index) register 310a functioning as a pointer to indicate a location where a new request is to be stored into the request ring buffer 125, and a request CI (consumer index) register 310b functioning as a pointer to indicate a location where a request to be read next by the request ring buffer 125 is stored. The request PI register 310a and the request CI register 310b are provided in an MMIO register 131a.

Specifically, the request PI register 310a indicates the location of the request ring buffer 125 storing a new request from a client accepted by the file server OS 105. The request CI register 310b indicates the location of the request ring buffer 125 to be read next by the block control microprogram 108.

Like the request ring buffer 125, the response ring buffer 126 includes two indexes. The response ring buffer 126 includes a response PI (producer index) register 311a functioning as a pointer to indicate a location where a new response is to be stored into the response ring buffer 126, and a response CI (consumer index) register 311b functioning as a pointer to indicate a location where a response to be accepted next by the response ring buffer 126 is stored. The response PI register 311a and the response CI register 311b are provided in the MMIO register 131a.

Specifically, the response PI register 311a indicates the location of the response ring buffer 126 storing a new response processed by the block control microprogram 108. The response CI register 311b indicates the location of the response ring buffer 126 to be read next by the file server OS 105.

The structure of the PCI configuration register 130 and that of the MMIO register 131 provided by the VMM 106 are described next. The PCI configuration register 130 of the virtual HBA 127 includes a field (BAR0 Addr) 301 to specify the MMIO register 131a targeted for operation, and a field (BAR1 Addr) 302 to specify an MMIO register 131b targeted for interrupt.

As shown in FIG. 3, the MMIO register 131a targeted for operation includes a request base field 321a to store a base address of the request ring buffer 125, a response base field 321b to store a base address of the response ring buffer 126, the aforementioned request PI register 310a and the request CI register 310b of the request ring buffer 125, the aforementioned response PI register 311a and the response CI register 311b of the response ring buffer 126, a virtual HBA status field 309 to store the status of the virtual HBA 127, and a virtual HBA enable field 308 to indicate the availability (start of use) of the virtual HBA 127.

The MMIO register 131b targeted for interrupt includes an extended message signaled interrupt (MSI-X) table 306 and a PBA (pending bit array) table 307 of MSI-X. Extended message signaled interrupt and PBA conform to the standards of PCI-Express.

The address translation table 129 generated by the VMM 106 is located in the user area 204 as a shared area allowing access both from the VMM 106 and the block control microprogram 108. As shown in FIG. 2A, the VMM 106 includes address translation information containing association between the guest physical address space 202 recognized by the file server OS 105 and the host physical address space 203 recognized by the block control microprogram 108. The address translation information is provided for the user area 204 assigned to the file server OS 105 and the supervisor area 205 to be accessed from the block control microprogram 108 and the VMM 106. As an example, this address translation information may be address AD#3 assigned as a start address of the user area 204 by the VMM 106. Specifically, an address obtained by adding address AD#3 to the guest physical address space 202 becomes the host physical address space 203.

When the VMM 106 boots the file server OS 105 as a guest OS, the address translation information is written as a start address of the memory resource 113 assigned to this guest OS into the address translation table 129. Then, the VMM 106 notifies the block control microprogram 108 of the contents of the address translation table 129. This allows the block control microprogram 108 to make communication using the address of the guest physical address space 202 recognized by the file server OS 105.

Addresses of the file system layer 121, the virtual HBA driver 123, and the virtual HBA 127 in the user area 204 are accessed from the file server OS 105 in the guest physical address space 202.

Specifically, the register (BAR0 Addr) 301 of the PCI configuration register 130 specifies a start address of the MMIO register 131a in the guest physical address space 202. The register (BAR1 Addr) 302 of the PCI configuration register 130 specifies a start address of the MMIO register 131b in the guest physical address space 202. This also applies to the MMIO register 131. The MMIO register 131a specifies respective base addresses, PIs, and CIs of the request ring buffer 125 and the response ring buffer 126 in the guest physical address space 202.

In contrast, the control table 133 of communication data path containing information about the communication data path to be used by the file server OS 105 and the block control microprogram 108 is located in the supervisor area 205 shown in FIGS. 1 and 2A.

The control table 133 of communication data path contains, in the host physical address space 203, an address to be used for access to a resource in the user area 204.

As described later, the control table 133 of communication data path is composed of a field 312 to store the status of POST (power on self test) of the virtual HBA 127, a field 313 to store the status of the virtual HBA 127 recognized by the block control microprogram 108, a field 314 to store the host physical address space 203 indicating the PCI configuration register 130, a field 315 to store the host physical address space 203 to be provided to the MMIO register 131a corresponding to the register (BAR0 Addr) 301 of the PCI configuration register 130, a field 316 to store the host physical address space 203 to be provided to the MMIO register 131b corresponding to the register (BAR1 Addr) 302 of the PCI configuration register 130, and a field 317 to store the host physical address space 203 to be provided to the address translation table 129. The control table 133 of communication data path will be described in detail by referring to FIGS. 4D and 4E.

In the storage of the aforementioned structure, the virtual HBA driver 123 is located in the user area (shared area) 204 allowing access from the file server OS 105, the VMM 106, and the block control microprogram 108. The file server OS 105 and the block control microprogram 108 make high-speed communication using the request ring buffer 125 and the response ring buffer 126 of the HBA driver 123 as the communication data path.

<Outline of Communication from File Server OS to Block Control Microprogram>

An outline of communication from the file server OS 105 to the block control microprogram 108 is described next.

The file server OS 105 stores an accepted request (command) from a client into the SCSI CDB 304 of the request ring buffer 125, and stores data associated with the request into the data buffer 124. Then, the file server OS 105 generates a buffer address list based on the location of the data in the data buffer 124 and stores the buffer address list into the SGL 303.

The block control microprogram 108 to acquire this request makes reference, for example by polling, to the control table 133 of communication data path to see address translation information in the address translation table 129 in the field 317 and an address of the MMIO register 131a in the field 315, thereby acquiring the request PI register 310a of the request ring buffer 125. Then, the block control microprogram 108 acquires from the SGL 303 the command in the SCSI CDB 304 of the request PI register 310a and the buffer address list indicting location information about the transfer data associated with this command.

Next, based on the address translation information in the address translation table 129, the block control microprogram 108 acquires from the request CI register 310b the location information about the transfer data described in the buffer address list in the SGL 303 in the guest physical address space 202. Then, using the address translation information, the block control microprogram 108 translates the guest physical address space 202 to the host physical address space 203. Then, using the translated host physical address space 203, the block control microprogram 108 reads the transfer data from the request ring buffer 125.

When read from the request ring buffer 125 is finished, the block control microprogram 108 updates the value of the request CI register 310b. Then, based on the command and the data read from the request ring buffer 125, the block control microprogram 108 accesses the storage device 120.

As a result of the aforementioned process, communication from the file server OS 105 to the block control microprogram 108 can be made through the communication data path set in the memory resource 113 without involving intervention by the VMM 106.

<Communication from Block Control Microprogram 108 to File Server OS 105>

In order to notify the file server OS 105 of a result of the access to the storage device 120, the block control microprogram 108 notifies the VMM 106 of the physical interrupt 134 in addition to writing into the response ring buffer 126.

In order to make a response about a result of the access to the storage device 120, the block control microprogram 108 makes reference to the control table 133 of communication data path to see the address translation information in the address translation table 129 in the field 317 and the address of the MMIO register 131a in the field 315, thereby acquiring an address of the response PI register 311a of the response ring buffer 126. Then, based on the address translation information, the block control microprogram 108 translates the guest physical address space 202 of the response PI register 311a to the host physical address space 203. The block control microprogram 108 thereafter writes a response to the requested command into the response PI register 311a.

Next, the block control microprogram 108 notifies the VMM 106 of the physical interrupt 134 to request the VMM 106 to notify the file server OS 105 of an interrupt. When receiving the physical interrupt 134, the VMM 106 notifies the virtual HBA 127 of the file server OS 105 of the virtual interrupt 128. The file server OS 105 receives an I/D interrupt from the virtual HBA 127 and reads the response from the response CI register 311b of the response ring buffer 126. The file server OS 105 transmits the response thereby read to the client. The file server OS 105 having finished reading updates the response CI register 311b.

The aforementioned process can realize communication from the block control microprogram 108 to the file server OS 105.

<Resource Management Table>

The resource management table 142 managed by the block control microprogram 108 is described next. The resource management table 142 includes the CPU assignment management table 401 where the CPU resource 112 is managed, the memory assignment management table 402 where the memory resource 113 is managed, and the I/O assignment management table 403 where the I/O resource 114 is managed.

FIG. 4A shows an example of the CPU assignment management table 401 managed by the block control microprogram 108.

The CPU assignment management table 401 includes entry 4011 containing a physical CPU core number of the CPU resource 112, entry 4012 containing the status of setting of the hardware-assisted virtualization (VMX) for each physical CPU core number, entry 4013 containing software as a host to which each physical CPU core number is assigned, and entry 4014 containing information about guest software to which each physical CPU core number is assigned.

The entries 4011 to 4014 of the CPU assignment management table 401 has fields of a number responsive to the number of physical CPU cores. In the entry 4012, "0" indicates that the hardware-assisted virtualization is set OFF and "1" indicates that the hardware-assisted virtualization is set ON. In the example shown in FIG. 4A, the hardware-assisted virtualization is set OFF for physical CPU core numbers 0 to 3 and is set ON for physical CPU core numbers 4 to 7.

The entry 4013 shows that physical CPU core numbers 0 to 3 are assigned to the block control microprogram 108 and physical CPU core numbers 4 to 7 are assigned to the VMM 106.

The entry 4014 shows that physical CPU core numbers 0 to 3 are hosts without guests and physical CPU core numbers 4 to 7 are assigned to the file server OS 105 as a guest.

FIG. 4B shows an example of the memory assignment management table 402 managed by the block control microprogram 108.

The memory assignment management table 402 manages software assigned to physical address space of the memory resource 113. In the example of FIG. 4B, software is assigned to each of three areas of the memory resource 113. The block control microprogram 108 is assigned to area 4021 of a physical address (physical memory range) of from 0 to 16 GB. The VMM 106 is assigned to area 4022 of a physical address of from 16 to 18 GB. The file server OS 105 is assigned to area 4023 of a physical address of from 18 to 32 GB.

FIG. 4C shows an example of the I/O assignment management table 403 managed by the block control microprogram 108.

The I/O assignment management table 403 includes fields 4031 to 4033 about corresponding I/O devices forming the I/O resource 114, an entry of software to become a host to which an I/O device is assigned, and an entry of software to become a guest to which an I/O device is assigned.

The field 4031 shows an example where the NIC 118 is assigned to the VMM 106 as a host and to the file server OS 105 as a guest. The field 4032 shows an example where the TA 119 is assigned to the block control microprogram 108 as a host without a guest. The field 4033 shows an example where the HBA 120b is assigned to the block control microprogram 108 as a host without a guest.

The resource management table 142 is shown to be held by the block control microprogram 108 in the example of this embodiment, whereas it may have a data structure distributed to the VMM 106. As an example, the CPU assignment management table 401 or the entry of a guest in the I/O assignment management table 403 may be held by the VMM 106.

<Control Table 133 of Communication Data Path>

FIG. 4D corresponds to the first half of a diagram showing an example of the control table 133 of communication data path managed by the VMM 106. FIG. 4E corresponds to the second half of the diagram showing the example of the control table 133 of communication data path managed by the VMM 106.

Regarding the control table 133 of communication data path, one table is composed of byte offset 1331 indicating the number of bytes determined from the beginning of the table to a current field, size 1332 indicating the length of a current field in the form of the number of bytes, field name 1333 containing the name of a field, meaning 1334 describing the contents of a current field, and setter 1335 containing software having set a current entry.

In the control table 133 of communication data path, header information 511 is stored in bytes from a zeroth byte to a seventh byte, and bytes from a $56^{th}$ byte and its subsequent bytes of FIG. 4E correspond to entries to be used in response to a plurality of queues.

In FIG. 4D, bytes from an eighth byte to a $47^{th}$ byte in the byte offset 1331 correspond to the fields 312 to 317 shown in FIG. 3.

The field 312 includes "vHBA device POST" set by the VMM 106 and indicating an initialization status of the virtual HBA 127. If the virtual HBA 127 is uninitialized, "vHBA device POST" is set "0." If the virtual HBA 127 starts service, "vHBA device POST" is set "1."

The field 313 includes "block Acknowledge" indicating a value recognized by the block control microprogram 108 while following the progress of a POST code of the virtual HBA 127.

The field 314 includes "(i) PCI configuration register location" specifying an address of the PCI configuration register 130 of a zeroth virtual HBA 127. This address is set by the VMM 106 in the host physical address space 203.

The field 315 includes "(ii) BAR0 MMIO register—operational" specifying an address of the MAR0 MMIO register 131a of the zeroth virtual HBA 127. This address is set by the VMM 106 in the host physical address space 203.

The field 316 includes "(iii) BAR1 MMIO register-MSI-X" specifying an address of an MSI-X table of the MAR1 MMIO register 131b of the zeroth virtual HBA 127. This address is set by the VMM 106 in the host physical address space 203.

The field 317 includes "(iv) Address translation Information" specifying an address of a structure holding translation information (translation from a guest physical address to a host physical address) about a memory address of the VMM 106 using the zeroth virtual HBA 127. This address is set by the VMM 106 in the host physical address space 203.

<Address Translation Table 129>

FIG. 4F shows an example of the address translation table 129 managed by the VMM 106. Regarding the address translation table 129, one table is composed of byte offset 1291 indicating the number of bytes determined from the beginning of the table to a current field, size 1292 indicating the length of a current field in the form of the number of bytes, field name 1293 containing the name of a field, meaning 1294 describing the contents of a current field, and setter 1295 containing software having set a current entry.

In the address translation table 129, header information 611 is stored in bytes from a zeroth byte to a seventh byte, and bytes from a $40^{th}$ byte and its subsequent bytes are used for entries containing multiple pieces of address translation information.

In FIG. 4F, a field 601 includes "LogicalStartAddress#0" indicating the beginning of the guest physical address space 202 as viewed from the VMM 106 (file server OS 105).

A field 602 includes "Size#0" indicting the size of the user area 204 recognized by the VMM 106 (file server OS 105).

A field 603 includes "PhysicalBase#0" indicating a host physical address corresponding to a beginning guest physical address (LogicalStartAddress#0") of the user area 204.

The block control microprogram 108 can translate a guest physical address to a host physical address using the translation information in the address translation table 129.

<PCI Configuration Register 130>

FIG. 8A shows an example of the PCI configuration register 130. The PCI configuration register 130 is composed of byte offset 1301 indicating the number of bytes determined from the beginning of the register to a current field, size 1302 indicating the length of a current field in the form of the number of bytes, field name 1303 containing the name of a field, initial value 1304 containing a value determined after initialization, and meaning and description 1305 describing the contents of a current field.

In the PCI configuration register 130, an address of the MMIO register 131a corresponding to the field 301 of FIG. 3 is stored in BAR0 in a tenth byte. In the PCI configuration register 130, an address of the MMIO register 131b corresponding to the field 302 of FIG. 3 is stored in BAR1 in an 18$^{th}$ byte.

<MMIO Register 131a (BAR0)>

FIG. 8B shows an example of the MMIO register 131a (BAR0).

The MMIO register 131a is composed of byte offset 1311 indicating the number of bytes determined from the beginning of the register to a current field, size 1312 indicating the length of a current field in the form of the number of bytes, name 1313 containing the name of a field, attribute 1314 indicating for example RO=read only or RW=read and write, and description 1315 describing the contents of a current field.

In the MMIO register 131a, "Queue enable request" in a 0128h$^{th}$ byte corresponds to the virtual HBA enable field 308 shown in FIG. 3, and "Queue status" in a 012Ch byte corresponds to the virtual HBA status field 309 shown in FIG. 3.

In the MMIO register 131a, "ITQ#0 base addr" in a 0140h$^{th}$ byte corresponds to the request base field 321a shown in FIG. 3 and contains a base address of the request ring buffer 125.

In the MMIO register 131a, "ITQ#0 length" in a 0148h$^{th}$ byte corresponds to length 1601 of the request ring buffer 125.

In the MMIO register 131a, "ITQ#0 PI/CI Value" in a 0150h$^{th}$ byte corresponds to the request PI register 310a and the request CI register 310b shown in FIG. 3.

In the MMIO register 131a, "TIQ#0 base addr" in a 0160h$^{th}$ byte corresponds to the response base field 321b shown in FIG. 3 and contains a base address of the response ring buffer 126. Further, "TIQ#0 length" in a 0168h$^{th}$ byte corresponds to length 1602 of the response ring buffer 126, and "TIQ#0 PI/CI Value" in a 0170h$^{th}$ byte corresponds to the response PI register 311a and the response CI register 311b shown in FIG. 3.

<Request Ring Buffer 125>

FIG. 9A shows an example of an entry data format for the request ring buffer 125. It specifications conform to the format for Information technology—SCSI over PCIe(R) Architecture (SOP) (T10/2239-D Revision 4).

One command generally falls in a range of from 64 to 128 bytes. Thus, in this embodiment, the size of a ring entry is controlled in units of 128 bytes, for example. A request exceeding 128 bytes is enqueued so as to extend over a next entry.

In the request ring buffer 125, "CDB" in a 32$^{nd}$ byte corresponds to the SCSI CDB 304 to store an SCSI command shown in FIG. 3. The request ring buffer 125 includes the SGL (scatter gather list) 303 to store a buffer address list in a 65th byte and its subsequent bytes.

<Response Ring Buffer 126>

FIG. 9B shows an example of an entry data format for the response ring buffer 126. Like the request ring buffer 125, the specifications of this format conform to the format for Information technology—SCSI over PCIe(R) Architecture (SOP). Like in the case of the request ring buffer 125, the size of a ring entry is controlled for example in units of 128 bytes in this embodiment. A request exceeding 128 bytes is enqueued so as to extend over a next entry. In the response ring buffer 126, bytes from a 12$^{th}$ byte to a 19$^{th}$ byte correspond to the status 305 shown in FIG. 3.

<SGL 303>

Figure 9C:
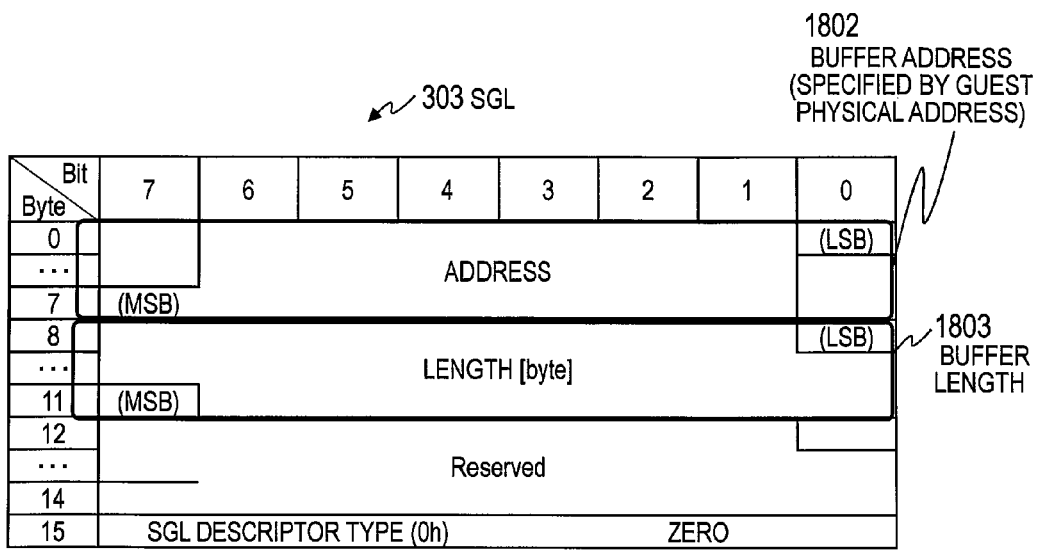
FIG. 9C shows the embodiment of this invention, and is an example of a descriptor data format for the SGL (scatter gather list).

FIG. 9C shows an example of a descriptor data format for the SGL (scatter gather list) 303. It specifications conform to the format for Information technology—PCIe(R) architecture Queuing Interface (PQI) (T10/2240-D Revision 6a).

The SGL 303 contains data composed of address section 1802 ranging from a zeroth to a seventh byte, and buffer length 1803 ranging from an eighth byte to an 11$^{th}$ byte.

The address section 1802 contains a pointer to a data buffer. This pointer is specified in the guest physical address space 202 recognized by the file server OS 105.

Referring to FIG. 9A, this data structure includes multiple data structures that can be stored in the fields of the SGL 303. The SGL 303 contains 16-byte entry data, so that four SGLs 303 can be specified typically in bytes from a 64$^{th}$ byte to a 127$^{th}$ byte in byte offset. If the number of SGLs exceeds four, the SGLs 303 are stored so as to extend over a next entry of the request ring buffer 125.

<Initialization Process of Communication Data Path>

Figure 5A:
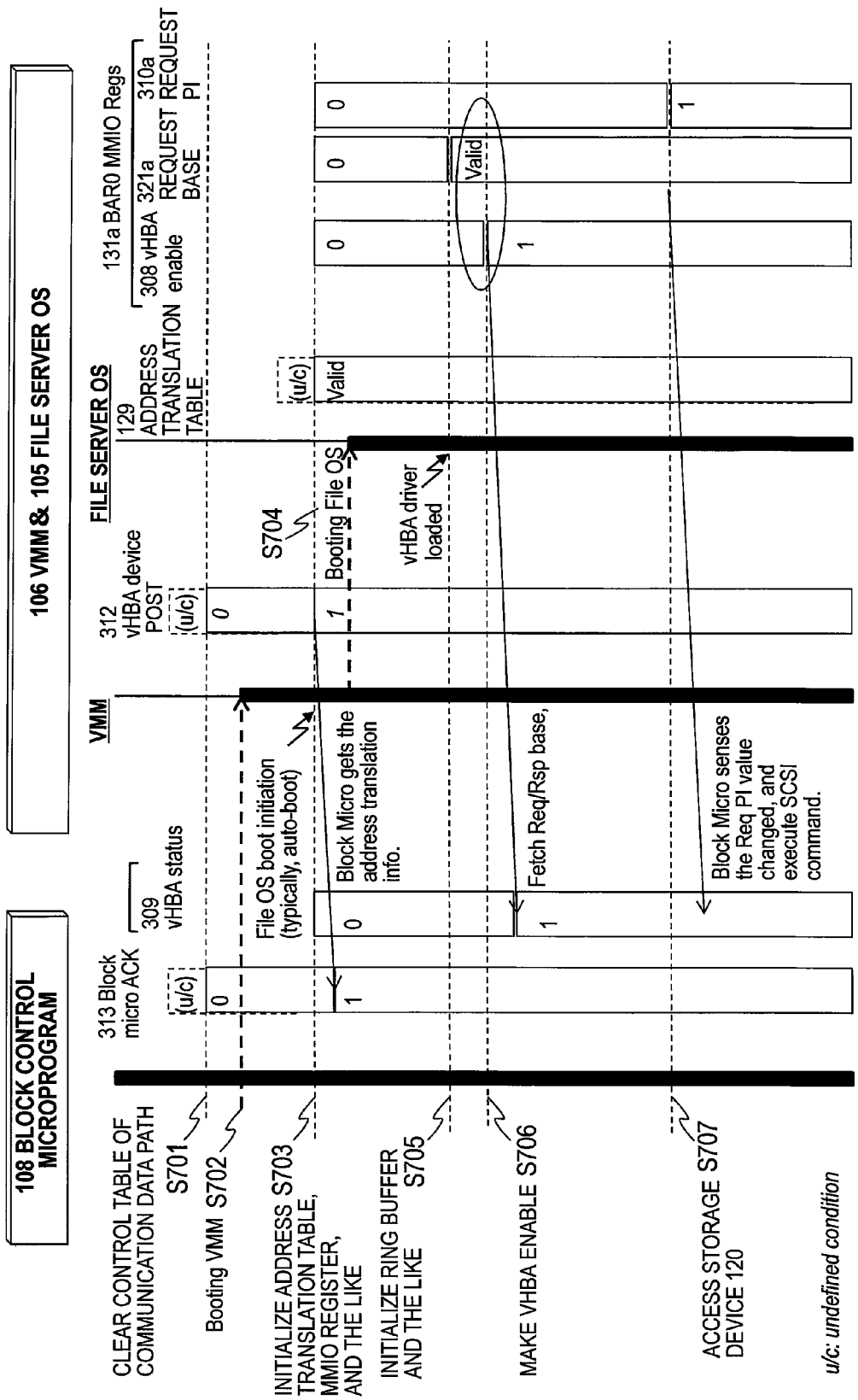
FIG. 5A shows the embodiment of this invention, and is a timing diagram showing an example of the initialization process of a communication data path.

Initialization process of a communication data path performed by the block control microprogram 108, the VMM 106, and the file server OS 105 is described next by referring to FIGS. 5A and 5B. FIG. 5A is a timing diagram showing an example of the initialization process of a communication data path. This process is performed after boot-up of the block control microprogram 108 is completed.

In step S701, the block control microprogram 108 clears the control table 133 of communication data path in the supervisor area 205. The VMM 106 does not boot up at this moment, so that the block control microprogram 108 clears a known address where the control table 133 of communication data path is located.

Next, the block control microprogram 108 boots the VMM 106 and then boots the file server OS 105 as a guest OS (S702). For this process, the block control microprogram 108 may read a boot image of the VMM 106 and that of the file server OS 105 into addresses from address AD#1 to address AD#3 in the host physical address space 203 shown in FIG. 2A and then assign the CPU resource 112 in the group A115 shown in FIG. 1.

When starting to boot up, the VMM 106 reserves a memory area (ranging from address AD#2 to address AD#3 of FIG. 2A) for the file server OS 105 and confirms the contents of the address translation table 129. Then, the VMM 106 initializes the PCI configuration register 130 and the MMIO register 131 (S703).

The VMM 106 starts to provide the virtual HBA 127 and boots the file server OS 105 as a guest OS (S704). The file server OS 105 after boot-up loads the virtual HBA driver 123 to make the virtual HBA 127 available (S705).

Then, the VMM 106 reserves an area for the request ring buffer 125 and that for the response ring buffer 126 in the user area 204. After setting the request ring buffer 125 and the response ring buffer 126, the VMM 106 sets a base address as a guest physical address in each of the request base field 321a and the response base field 321b. Then, the VMM 106 sets the request PI register 310a and the request CI register 310b of the request ring buffer 125, and sets the response PI register 311a and the response CI register 311b of the response ring buffer 126.

After setting the request ring buffer 125 and the response ring buffer 126, the VMM 106 sets "1" in the virtual HBA enable field 308 to indicate start of use, thereby making the virtual HBA 127 enable (S706). The VMM 106 thereafter sets "1" in the virtual HBA status field 309, so that the status of the virtual HBA 127 is set enable.

When the aforementioned settings are finished, the file server OS 105 starts to make access (SCSI block access) to the storage device 120 through the block control microprogram 108 (S707).

During the aforementioned initialization process, the control table 133 of communication data path is initialized as follows.

In step S701, the block control microprogram 108 clears the control table 133 of communication data path. In response to change of the status of the virtual HBA 127 or completion of the initialization process occurred thereafter, the block control microprogram 108 and the VMM 106 set the control table 133 of communication data path sequentially.

First, in step S703, the VMM 106 reserves a memory area (ranging from address AD#2 to address AD#3 of FIG. 2A) for the file server OS 105. Then, the contents of the address translation table 129 are set. Accordingly, the VMM 106 sets an address of the address translation table 129 in the field 317 of the control table 133 of communication data path.

As a result of the initialization of the PCI configuration register 130 and the MMIO register 131 by the VMM 106, an address of the PCI configuration 130, an address of the MMIO register 131a, and an address of the MMIO register 131b are set in the fields 314, 315, and 316 respectively in the control table 133 of communication data path.

The initialization of the HBA 127 is completed in step S703. Hence, the VMM 106 sets "vHBA device POST" in the field 312 "1" in the control table 133 of communication data path.

After being initialized in step S703, the virtual HBA 127 becomes recognizable by the block control microprogram 108. Accordingly, the block control microprogram 108 sets the field 312 "1" in the control table 133 of communication data path. In this way, the VMM 106 and the block control microprogram 108 set the control table 133 of communication data path in response to the progress of the initialization.

Figure 5B:
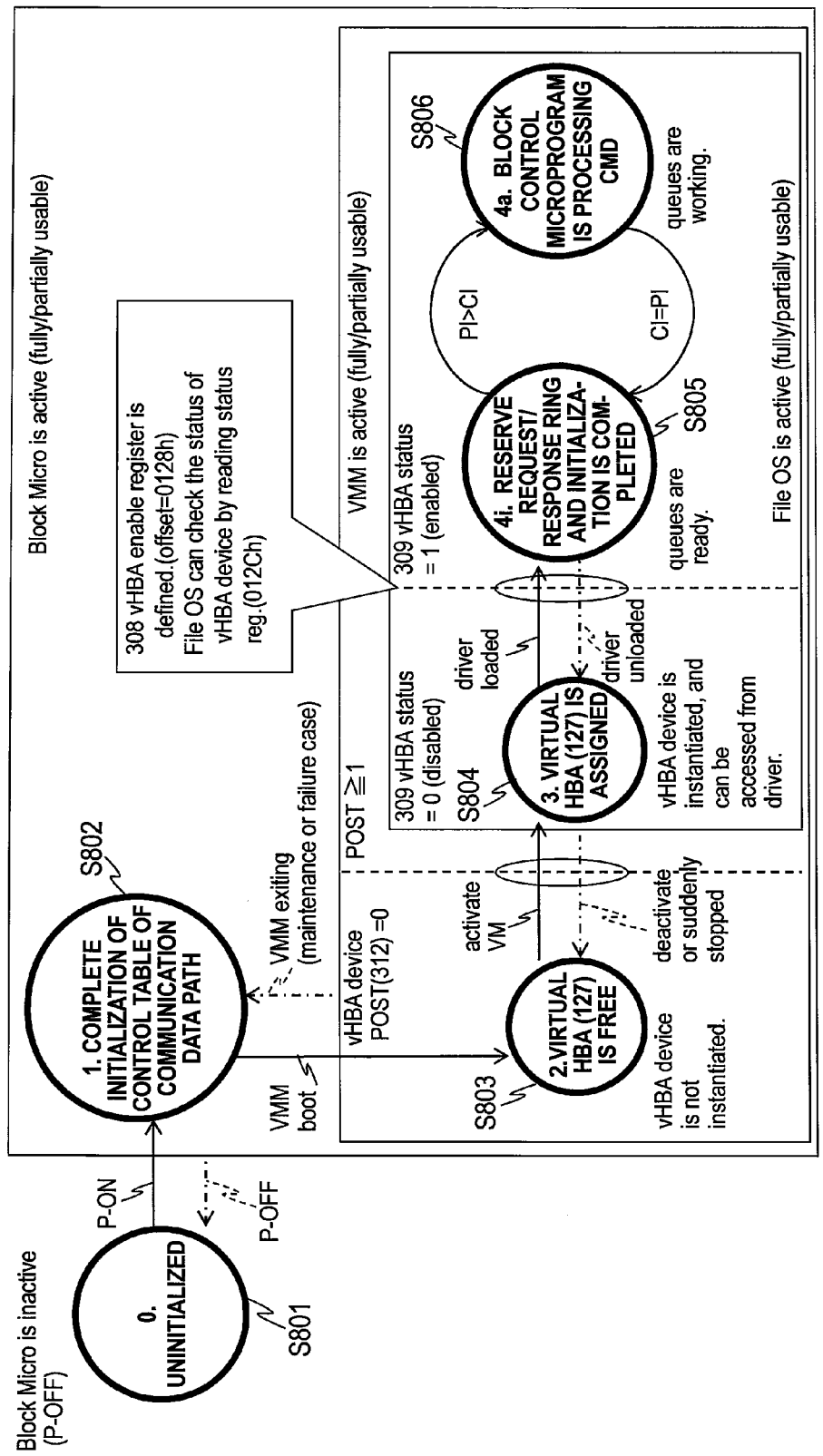
FIG. 5B shows the embodiment of this invention, and is a sequence diagram showing an outline of process starting with boot-up of the storage device and ending with execution of the file server OS.

FIG. 5B is a sequence diagram showing an outline of process starting with boot-up of the storage device and ending with execution of the file server OS 105.

When the storage device in a halt condition (S801) is powered on, the block control microprogram 108 clears the control table 133 of communication data path for initialization (S802 corresponding to step S701 of FIG. 5A).

Next, the block control microprogram 108 boots the VMM 106 (S702 of FIG. 5A) to make the VMM 106 initialize the virtual HBA 127 (S803). The virtual HBA 127 is not assigned to a guest OS at a time when the VMM 106 finishes initializing the virtual HBA 127, so that POST for the virtual HBA 127 in the field 312 of the control table 133 of communication data path assumes a value 0.

When the VMM 106 makes the file server OS 105 run as a guest OS, the VMM 106 assigns the virtual HBA 127 to the file server OS 105 (S804). The file server OS 105 has not loaded the virtual HBA driver 123 in this status, so that the virtual HBA status field 309 assumes a value "0."

When the file server OS 105 loads the virtual HBA driver 123 and settings for the request ring buffer 125 and the response ring buffer 126 are finished, the virtual HBA 127 becomes available (S805). The virtual HBA status field 309 assumes a value "1" at this moment.

When the file server OS 105 accepts a request from a client and writes a command and data into the request ring buffer 125, the request PI register 310a is updated and the block control microprogram 108 processes this request (S806). After finishing the process, the block control microprogram 108 writes a result of access to the storage device 120 into the response PI register 311a of the response ring buffer 126 and then finishes the process (step S805).

<Process of Communication From File Server OS to Block Control Microprogram>

Figure 6A:
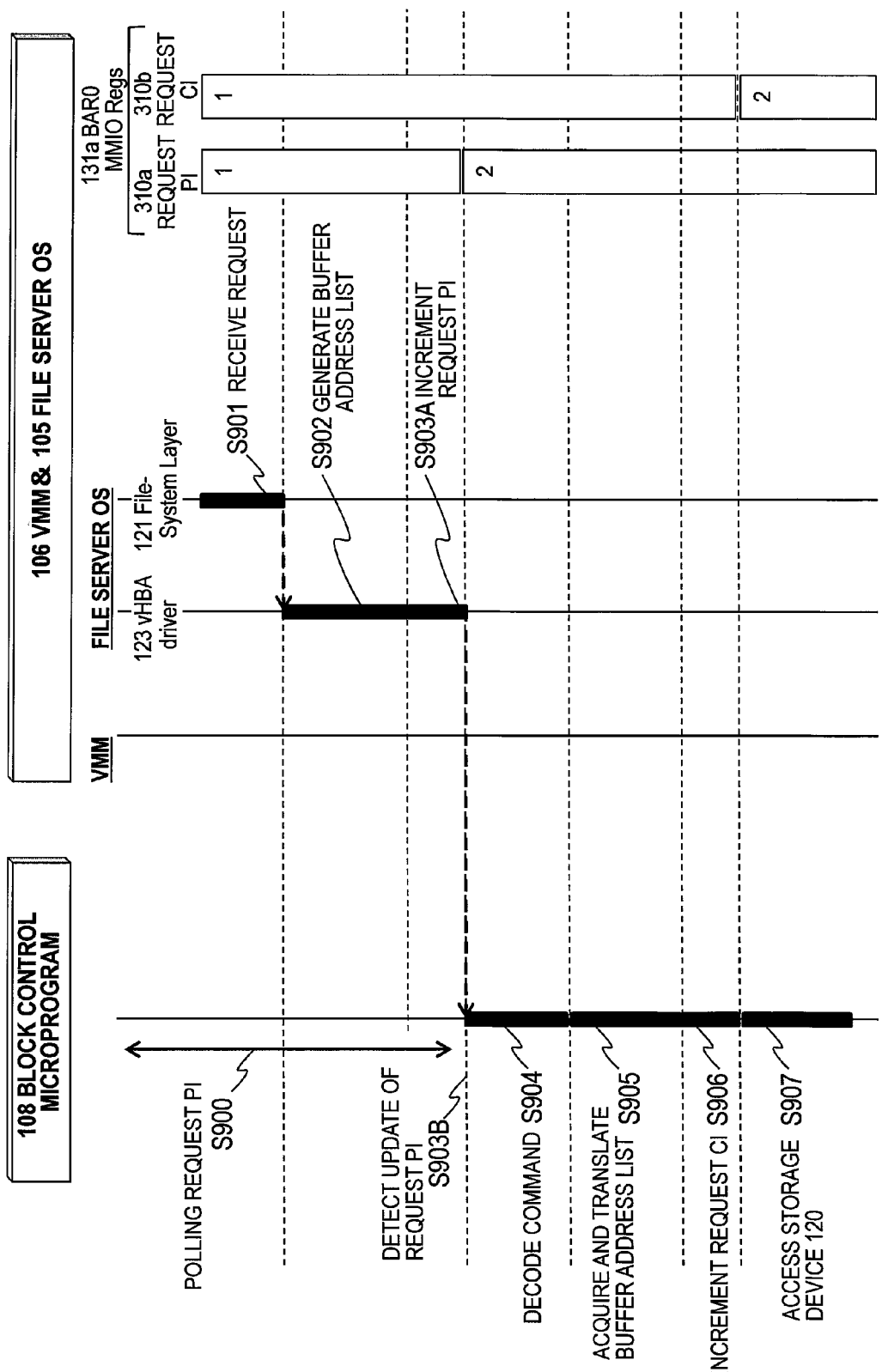
FIG. 6A shows the embodiment of this invention, and is a timing diagram showing an example of process of communication from the file server OS to the block control microprogram.

FIG. 6A is a timing diagram showing an example of process of communication from the file server OS 105 to the block control microprogram 108.

In step S901, the file server OS 105 receives for example an NFS (network file system) request from a client as a request for access to the storage device 120. The file server OS 105 reserves the data buffer 124 to store data corresponding to a command in the received request.

The file server OS 105 generates a buffer address list indicating the data buffer 124 storing the received data. The file server OS 105 stores the received command and the buffer address list about the data into the request ring buffer 125 (S902).

In order to update the location of the request ring buffer 125 to accept a next request, the file server OS 105 increments the request PI register 310a (S903A).

Meanwhile, the block control microprogram 108 monitors the request PI register 310a as a pointer of the request ring buffer 125 by polling, for example (S900). In step S903B, the block control microprogram 108 detects the update of the request PI register 310a and reads a command from the request ring buffer 125 specified by the request PI register 310a.

Next, the block control microprogram 108 decodes the read command to determine if the access to be made to the storage device 120 is read or write (S904).

If the read command is write, the block control microprogram 108 acquires the buffer address list from the SGL 303 of the request ring buffer 125 indicated by the request PI register 310a. Next, the block control microprogram 108 reads the address translation table 129, translates the guest physical address space 202 in the buffer address list to the host physical address space 203, and specifies the location of the data buffer 124 (S905).

The block control microprogram 108 increments the value of the request CI register 310b to update the location of the request ring buffer 125 to be read next (S906). Then, the block control microprogram 108 accesses the storage device 120 with the acquired command and data about the buffer address list (S907).

As a result of the aforementioned process, the file server OS 105 and the block control microprogram 108 can communicate with each other directly without involving intervention by the VMM 106. This reduces overhead necessitated by switching to the VMM 106, thereby facilitating process at higher speed.

Figure 6B:
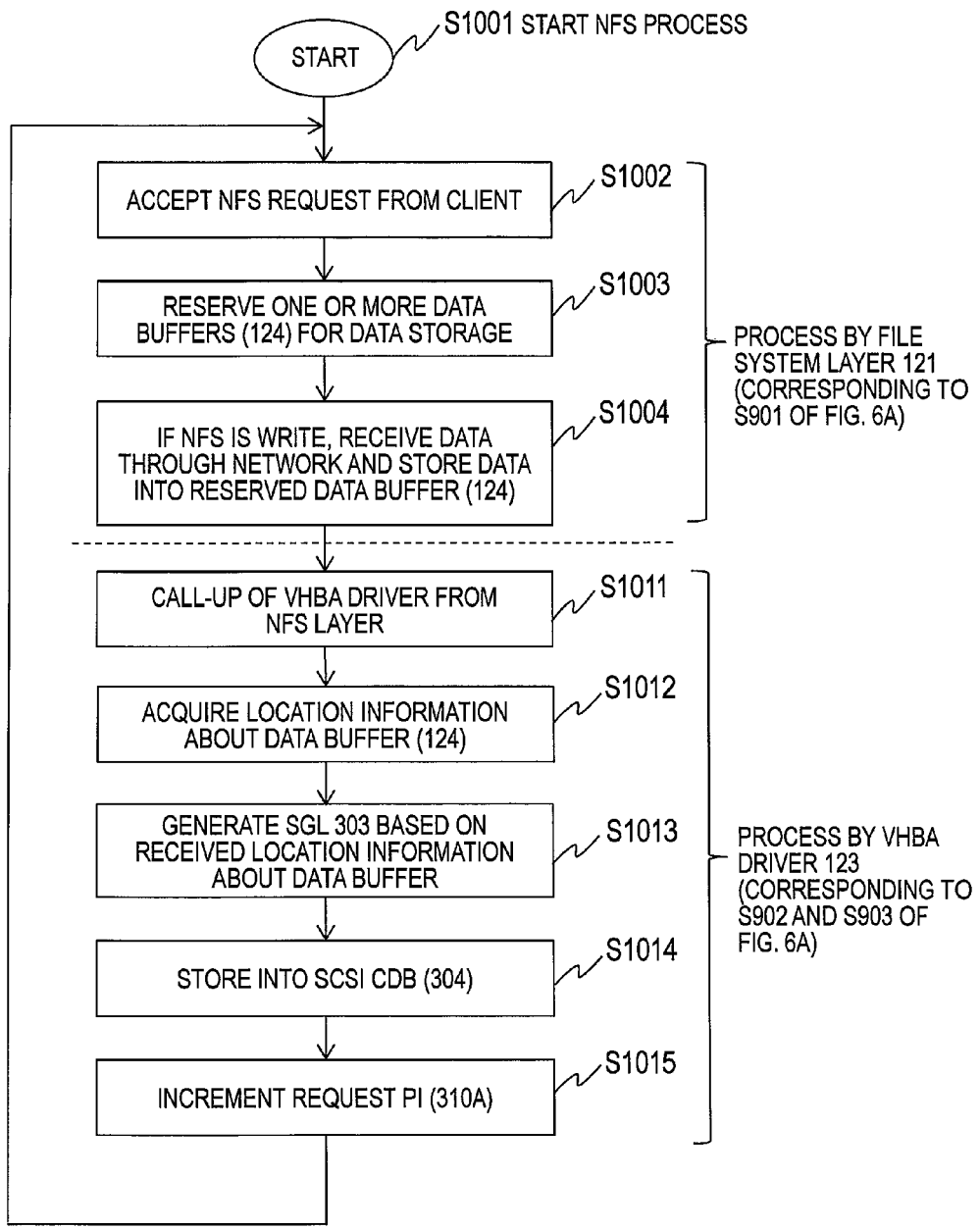
FIG. 6B shows the embodiment of this invention, and is a flowchart showing an example of process constituting part of the aforementioned process of FIG. 6A and flowing from the file server OS to the block control microprogram.

FIG. 6B is a flowchart showing an example of process constituting part of the aforementioned process of FIG. 6A and flowing from the file server OS 105 to the block control microprogram 108.

The process is started when the file server OS 105 accepts a request for access to the storage device 120 from a client (S1002). As an example, the file server OS 105 receives an NFS request as the access request. The file server OS 105 reserves the data buffer 124 to store data corresponding to a command in the received request (S1003).

The file server OS 105 generates a buffer address list indicating the data buffer 124 storing the received data. The file server OS 105 stores the received command and the buffer address list about the data into the request ring buffer 125 (S1004).

The file server OS 105 calls up the virtual HBA driver 123 (S1011), and acquires the location of the data buffer 124 from the MMIO register 131a (S1012).

The file server OS 105 generates a buffer address list based on the location of the data buffer 124 storing the received data and stores the buffer address list into the SGL 303 of the request ring buffer 125 (S1014). The file server OS 105 further stores the command directed to the storage device 120 into the SCSI CDB (command description block) 304.

In order to update the location of the request ring buffer 125 to accept a next request, the file server OS 105 then increments the request PI register 310a (S1015).

The file server OS 105 repeats the aforementioned process to store the accepted command and data into the request ring buffer 125.

Figure 6C:
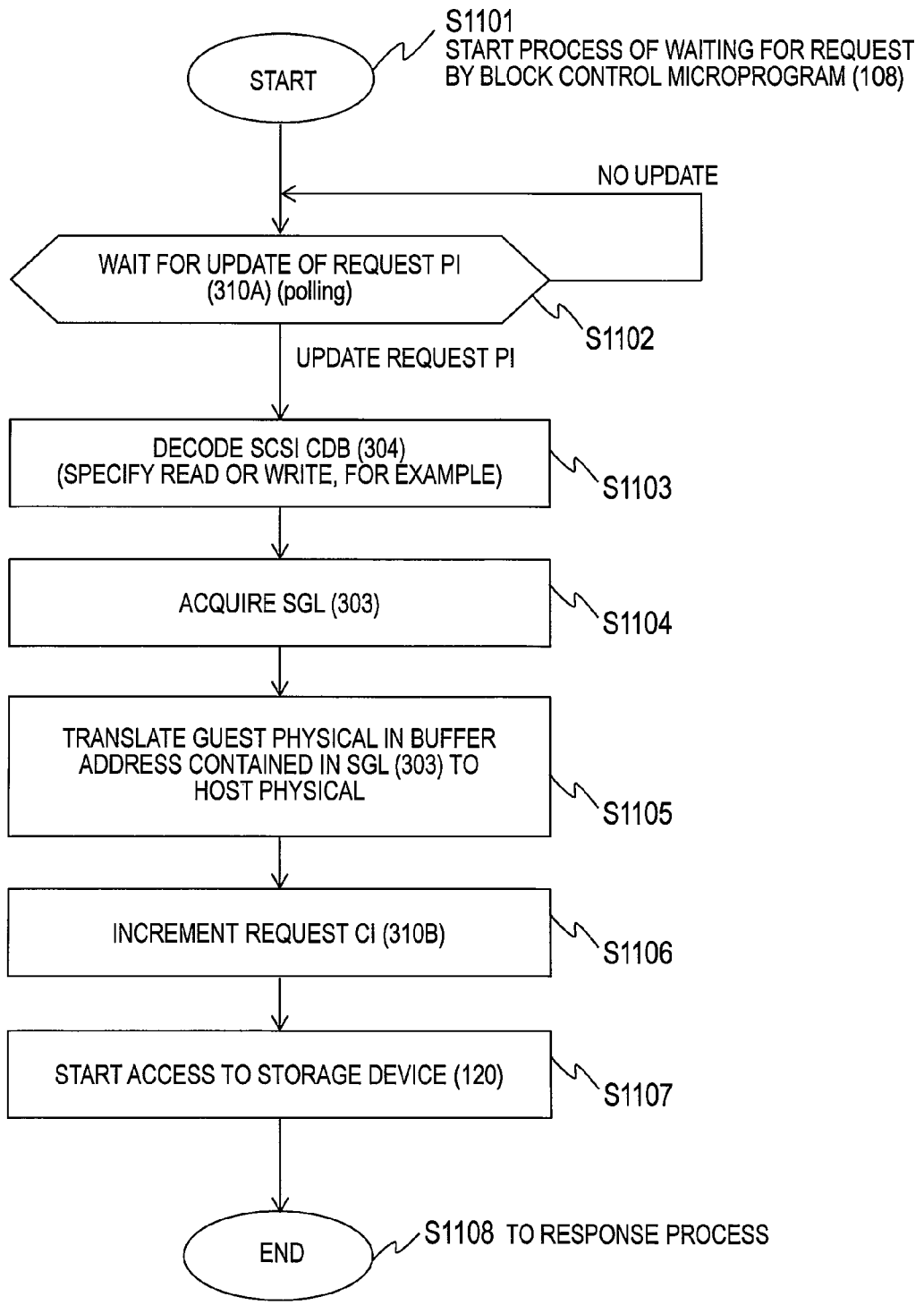
FIG. 6C shows the embodiment of this invention, and is a flowchart showing an example of process constituting part of the aforementioned process of FIG. 6A and performed by the block control microprogram.

FIG. 6C is a flowchart showing an example of process constituting part of the aforementioned process of FIG. 6A and performed by the block control microprogram 108.

This process is started in response to boot-up of the block control microprogram 108 (S1101). The block control microprogram 108 makes polling while waiting for update of the request PI register 310a as a pointer of the request ring buffer 125 (S1102).

When the request PI register 310a is updated, the block control microprogram 108 reads a command from the request ring buffer 125 specified by the request PI register 310a. The block control microprogram 108 decodes the read command to determine if the access to the storage device 120 is read or write (S1103).

If the read command is write, the block control microprogram 108 acquires the buffer address list from the SGL 303 of the request ring buffer 125 indicated by the request PI register 310a (S 1104).

Next, the block control microprogram 108 reads the address translation table 129, translates the guest physical address space 202 in the buffer address list to the host physical address space 203, and specifies the location of the data buffer 124 (S1105).

The block control microprogram 108 increments the value of the request CI register 310b to update the location of the request ring buffer 125 to be read next (S1106). Then, the block control microprogram 108 accesses the storage device 120 with the acquired command and data about the buffer address list (S1107). After the access is finished, the block control microprogram 108 proceeds to response process described later.

Figure 7A:
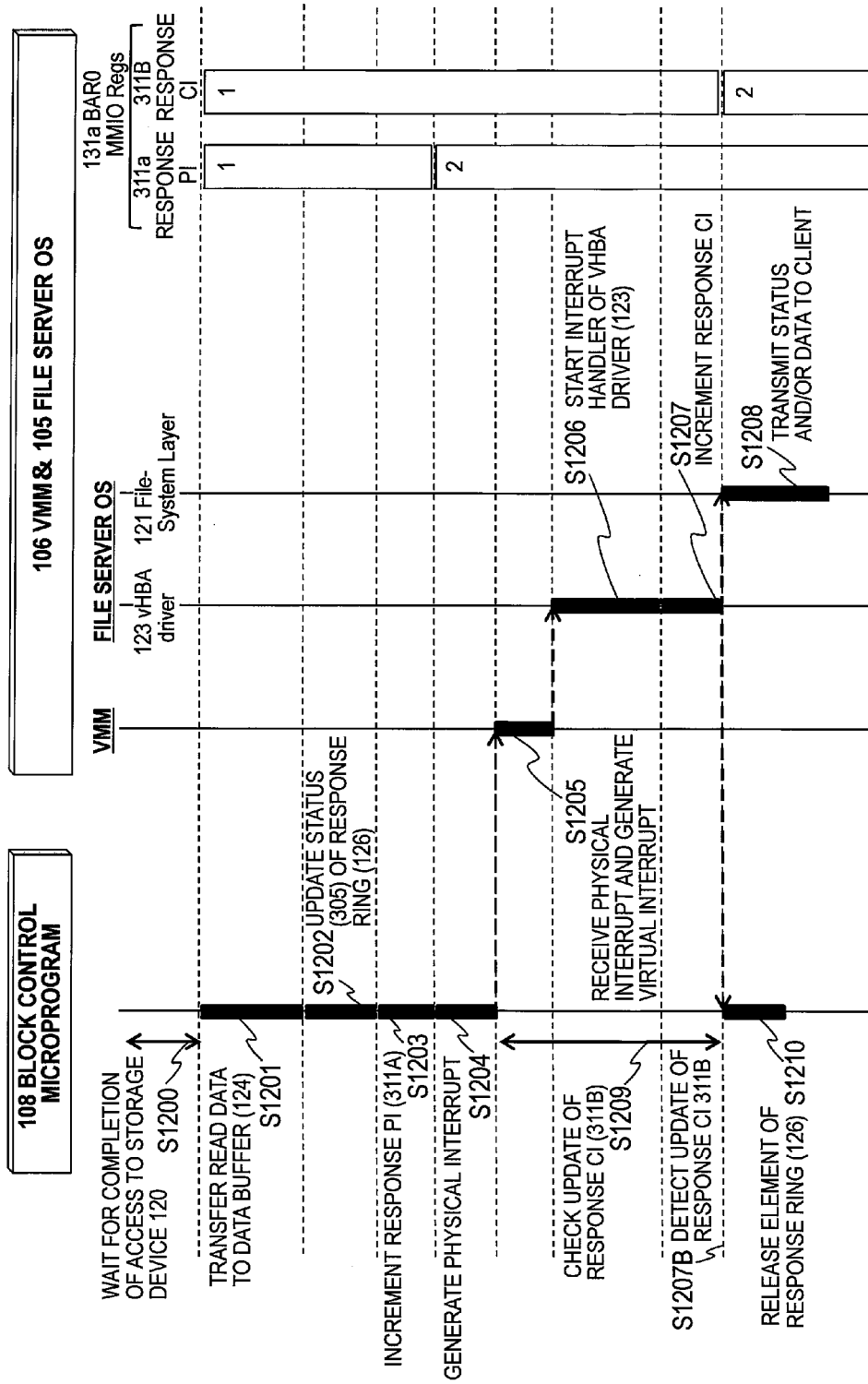
FIG. 7A shows the embodiment of this invention, and is a timing diagram showing an example of process of communication from the block control microprogram to the file server OS.

FIG. 7A is a timing diagram showing an example of process of communication from the block control microprogram 108 to the file server OS 105.

After step S907 of FIG. 6A, the block control microprogram 108 is placed in standby while waiting for completion of access to the storage device 120 (S1200). After completing the access to the storage device 120, the block control microprogram 108 receives from the storage device 120 a response (data) responsive to a request. In the example described below, the request directed to the storage device 120 is read.

The block control microprogram 108 transfers the data read from the storage device 120 to the data buffer 124 (S1201). For this transfer, the block control microprogram 108 performs copying process or makes DMA.

The block control microprogram 108 writes into the status 305 of the response ring buffer 126 the location of the data buffer 124 where the data is copied, thereby updating the status 305 (S1202).

Next, in step S1203, the block control microprogram 108 increments the value of the response PI register 311a to update the location of the response ring buffer 126 to store a next response.

Next, the block control microprogram 108 generates the physical interrupt 134 and transmits the physical interrupt 134 to the VMM 106 (S1204). This physical interrupt 134 is an IPI (inter-processor interrupt) as an interrupt between processors given from the CPU resource 112 in the group BB 116 executing the block control microprogram 108 to the group A115.

When receiving the physical interrupt 134, the VMM 106 generates the virtual interrupt 128 and notifies the virtual HBA driver 123 of the file server OS 105 of the virtual interrupt 128.

When receiving the virtual interrupt 128 from the VMM 106, the virtual HBA driver 123 starts a certain interrupt handler and reads the status 305 of the response ring buffer 126. Then, the virtual HBA driver 123 of the file server OS 105 acquires data from the location of the data buffer 124 stored in the status 305.

Then, the file server OS 105 increments the value of the response CI register 311b to update the location of the response ring buffer 126 to store a next response (S1207). Next, the file system layer 121 of the file server OS 105 transmits a response from the storage device 120 to the client.

After transmitting the physical interrupt 134, the block control microprogram 108 makes polling to check update of the response CI register 311b of the response ring buffer 126 (S1209).

If detecting the update of the response CI register 311b (S1207B), the block control microprogram 108 releases the status 305 of the response ring buffer 126.

As a result of the, aforementioned process, a response from the block control microprogram 108 is transmitted to the file server OS 105 through the response ring buffer 126 and the physical interrupt 134.

Figure 7B:
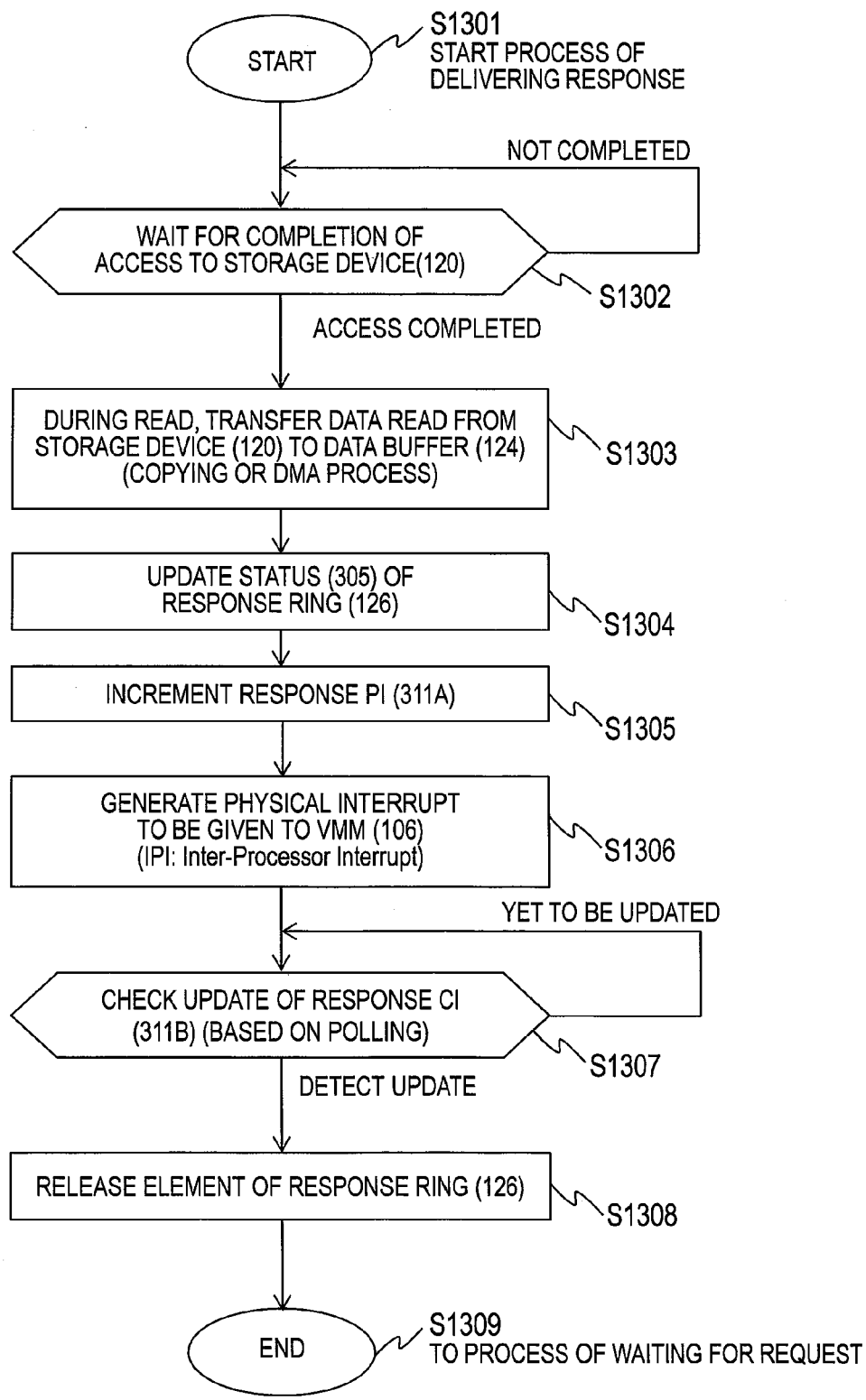
FIG. 7B shows the embodiment of this invention, and is a flowchart showing an example of process constituting part of the aforementioned process of FIG. 7A and performed by the block control microprogram.

FIG. 7B is a flowchart showing an example of process constituting part of the aforementioned process of FIG. 7A and performed by the block control microprogram 108.

After step S1108 of FIG. 6C, the block control microprogram 108 is placed in standby while waiting for completion of access to the storage device 120 (S1302). After completing the access to the storage device 120, the block control microprogram 108 receives from the storage device 120 a response (data) responsive to a request. As mentioned above, in the example described below, the request directed to the storage device 120 is read.

The block control microprogram 108 transfers the data read from the storage device 120 to the data buffer 124 (S1303). For this transfer, the block control microprogram 108 performs copying process or makes DMA.

The block control microprogram 108 writes into the status 305 of the response ring buffer 126 the location of the data buffer 124 where the data is copied, thereby updating the status 305 (S1304).

Next, in step S1305, the block control microprogram 108 increments the value of the response PI register 311a to update the location of the response ring buffer 126 to store a next response (S1305).

Next, the block control microprogram 108 generates the physical interrupt 134 and transmits the physical interrupt 134 to the VMM 106 (S1306). This physical interrupt 134 is an IPI (inter processor interrupt) as an interrupt between processors given from the CPU resource 112 in the group BB 116 executing the block control microprogram 108 to the group A115.

After transmitting the physical interrupt 134, the block control microprogram 108 makes polling to check update of the response CI register 311b of the response ring buffer 126 (S1307).

If detecting the update of the response CI register 311b (S1207B), the block control microprogram 108 releases the status 305 of the response ring buffer 126 and finishes the process. Then, the block control microprogram 108 returns to step S1101 of FIG. 6C.

Figure 7C:
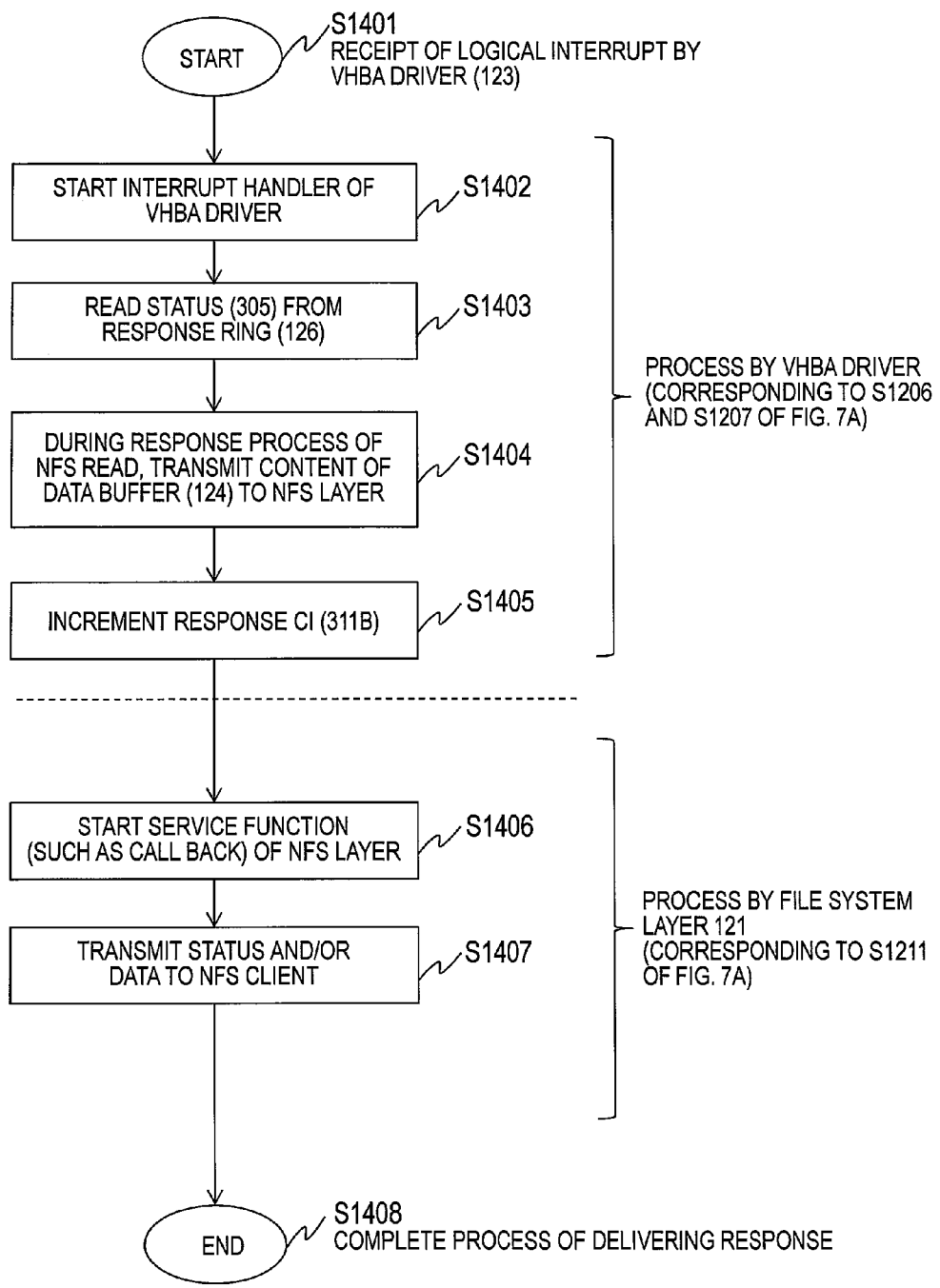
FIG. 7C shows the embodiment of this invention, and is a flowchart showing the embodiment of this invention.

FIG. 7C is a flowchart showing the embodiment of this invention. FIG. 7C shows an example of process constituting part of the aforementioned process of FIG. 7A and performed by the file server OS 105.

When receiving the physical interrupt 134 from the block control microprogram 108, the VMM 106 generates the virtual interrupt 128 and notifies the virtual HBA driver 123 of the file server OS 105 of the virtual interrupt 128.

When the virtual HBA driver 123 receives the virtual interrupt 128 from the VMM 106, the file server OS 105 starts the process of FIG. 7C.

In response to receipt of the virtual interrupt 128, the virtual HBA driver 123 starts a certain interrupt handler (S1402) and reads the status 305 from the response ring buffer 126 (S1403).

The file server OS 105 acquires data from the location of the data buffer 124 stored in the status 305 (S1404). This step is responsive to the case where the access to the storage device 120 is read. The virtual HBA driver 123 notifies the file system layer 121 of the contents of the data buffer 124.

The file server OS 105 increments the value of the response CI register 311b to update the location of the response ring buffer 126 to store a next response (S1405).

The file server OS 105 starts a certain function of the file system layer 121 (S1406), and transmits a response from the storage device 120 to the client (S1407).

As a result of the aforementioned process, the file server OS 105 can transmit the contents of the response ring buffer 126 to the client based on the virtual interrupt 128.

<Supplemental>

In this embodiment, the file server OS 105 on the VMM 106 and the block control microprogram 108 to run on the same hardware 109 as the VMM 106 communicate with each other using a communication data path set in the memory resource 113.

The communication data path in the memory resource 113 is composed of the data buffer 124, the request ring buffer 125, the response ring buffer 126, the MMIO register 131, the address translation table 129, and the control table 133 of communication data path. Communication from the file server OS 105 to the block control microprogram 108 can be made at high speed without involving intervention by the VMM 106.

In the aforementioned embodiment, the VMM 106 is used as software to generate a virtual machine. A hypervisor may also be used as such software.

In the aforementioned embodiment, VT-x available from Intel Corporation is used as the hardware-assisted virtualization for the CPU resource 112. A function intended to assist in virtualization such as AMD-V available from AMD Co. is also applicable.

In the aforementioned embodiment, the CPU resource 112 is composed of a multicore CPU having the hardware-assisted virtualization. A processor resource may also be composed of a heterogeneous multicore processor.

In the aforementioned embodiment, the request ring buffer 125 and the response ring buffer 126 are used as a communication data path. However, this is not the only example but a communication data path may also be composed of a buffer such as a queue.

The structure for example of the computer, the processor, the processing means and the like described in this invention can be realized in part or entirely by dedicated hardware.

The software of various types shown as examples in this embodiment can be stored in various recording media (including non-transitory storage media, for example) such as electromagnetic recording media, electronic recording media, and optical recording media, and can be downloaded on computers through communication networks such as the Internet.

This invention is not intended to be limited to the aforementioned embodiment but it can cover numerous modifications. As an example, the embodiment is described in detail for the sake of clear understanding of this invention. This invention does not always include all the structures described above.

What is claimed is:

1. A method of controlling a computer system with a plurality of processors having a hardware-assisted virtualization and a memory,
the computer system comprising a first processor group of the processors having hardware-assisted virtualization set disabled among the plurality of processors, and a second processor group of the processors and having hardware-assisted virtualization set enabled among the plurality of processors,
the method comprising:
a first step of booting a first OS by assigning the first processor group to the first OS;
a second step of booting a virtual machine monitor to boot a virtual machine by assigning the second processor group to the virtual machine monitor;
a third step performed by the virtual machine monitor, the third step booting a second OS by assigning a certain area of the memory to the second OS; and
a fourth step performed by the virtual machine monitor, the fourth step setting a data path through which the first OS and second OS communicate with each other, the data path being set in the memory.

2. The method of controlling the computer system according to claim 1, further comprising:
a fifth step performed by the virtual machine monitor, the fifth step generating data path control information containing address information and the status of generation about the data path located in the memory;
a sixth step performed by the virtual machine monitor, the sixth step detecting start of use of the data path; and
a seventh step performed by the virtual machine monitor, the seventh step notifying the first OS of start of use of the data path.

3. The method of controlling the computer system according to claim 2, wherein
  in the fourth step, the virtual machine monitor sets a shared area in the memory, the shared area allowing access both from the virtual machine monitor and the first OS,
  in the fifth step, the virtual machine monitor generates address translation information containing association between a guest physical address recognized by the second OS and a host physical address recognized by the first OS, the address translation information being provided to the area of the memory assigned to the second OS, and
  the third step comprises:
  a step performed by the virtual machine monitor, the step confirming the address translation information;
  a step performed by the virtual machine monitor, the step storing the address translation information into the shared area; and
  a step performed by the virtual machine monitor, the step notifying the first OS of the storing of the address translation information into the shared area.

4. The method of controlling the computer system according to claim 3, wherein
  the computer system further comprises a storage device controlled by the first OS, and
  the data path includes a request buffer to store a request directed to the storage device and a buffer address list containing location information about data accompanying the request,
  the method further comprising:
  an eighth step performed by the second OS, the eighth step receiving a request directed to the storage device and data accompanying the request;
  a ninth step performed by the second OS, the ninth step generating a buffer address list indicating location information about the received data;
  a tenth step performed by the second OS, the tenth step storing the request and the buffer address list into the request buffer; and
  an eleventh step performed by the first OS, the eleventh step acquiring the request from the request buffer and acquiring the data accompanying the request by referring to the buffer address list.

5. The method of controlling the computer system according to claim 4, wherein
  the virtual machine monitor sets a request PI (producer index) register indicating a location where a new request is to be stored into the request buffer and a request CI (consumer index) register indicating a location of a request to be read from the request buffer, and provides the first and second OSs with the request PI register and the request CI register, the request PI register and the request CI register being set in the memory,
  in the tenth step, the second OS stores the request and the buffer address list into the request buffer and then updates the request PI register, and
  in the eleventh step, the first OS monitors update of the request PI register, and if the request PI register is updated, the first OS acquires a request directed to the storage device and data accompanying the request from the request buffer and then updates the request CI register.

6. The method of controlling the computer system according to claim 5, wherein in the eleventh step, the first OS acquires, by referring to the buffer address list, location information about the data contained in the buffer address list with the guest physical address, acquires the address translation information, translates the guest physical address to the host physical address, and reads the data using the translated host physical address.

7. The method of controlling the computer system according to claim 4, wherein the data path includes a response buffer to store a response containing a result of process on the request directed to the storage device,
  the method further comprising:
  a twelfth step performed by the first OS, the twelfth step executing the acquired request directed to the storage device and acquiring a response from the storage device;
  a thirteenth step performed by the first OS, the thirteenth step storing the response into the response buffer; and
  a fourteenth step performed by the second OS, the fourteenth step acquiring the response from the response buffer.

8. The method of controlling the computer system according to claim 7, wherein
  the virtual machine monitor sets a response PI (producer index) register indicating a location where a new response is to be stored into the response buffer and a response CI (consumer index) register indicating a location of a response to be read next from the response buffer, and provides the first and second OSs with the response PI register and the response CI register, the response PI register and the response CI register being set in the memory,
  in the thirteenth step, the first OS stores the response into the response buffer, then updates the response PI register, and notifies the virtual machine monitor of an interrupt, and
  in the fourteenth step, the virtual machine monitor notifies the second OS of the interrupt on receipt of the interrupt, and the second OS reads the response from the response buffer by referring to the response CI register and then updates the response CI register.

9. A computer system with a plurality of processors having a hardware-assisted virtualization and a memory,
  the computer system comprising:
  a first processor group of the processors having hardware-assisted virtualization set disabled among the plurality of processors;
  a second processor group of the processors having hardware-assisted virtualization set enabled among the plurality of processors;
  a first OS to control the computer system by being provided with the first processor group assigned to the first OS; and
  a virtual machine monitor to boot a virtual machine by being provided with the second processor group assigned to the virtual machine monitor,
  wherein the virtual machine monitor boots a second OS by assigning a certain area of the memory to the second OS to provide the second OS as a virtual machine, and sets a data path through which the first and second OSs communicate with each other, the data path being set in the memory.

10. The computer system according to claim 9, wherein the virtual machine monitor generates data path control information containing address information and the status of generation of the data path located in the memory, detects start of use of the data path, and if detecting the start of use, notifies the first OS of the start of use of the data path.

11. The computer system according to claim 10, wherein the virtual machine monitor sets a shared area in the memory allowing access both from the virtual machine monitor and the first OS, generates address translation information containing association between a guest physical address recognized by the second OS and a host physical address recognized by the first OS, stores the address translation information into the shared area, and notifies the first OS of the storing of the address translation information into the shared area, the address translation information being provided to the area of the memory assigned to the second OS.

12. The computer system according to claim 11, further comprising a storage device controlled by the first OS, wherein
 the data path includes a request buffer to store a request directed to the storage device and a buffer address list containing location information about data accompanying the request,
 the second OS receives a request directed to the storage device and data accompanying the request, generates a buffer address list indicating location information about the received data, and stores the request and the buffer address list into the request buffer, and
 the first OS acquires the request from the request buffer and acquires the data accompanying the request by referring to the buffer address list.

13. The computer system according to claim 12, wherein
 the virtual machine monitor sets a request PI (producer index) register indicating a location where a new request is to be stored into the request buffer and a request CI (consumer index) register indicating a location of a request to be read from the request buffer, and provides the first and second OSs with the request PI register and the request CI register, the request PI register and the request CI register being set in the memory,
 the second OS stores the request and the buffer address list into the request buffer and then updates the request PI register, and
 the first OS checks update of the request PI register, and if the request PI register is updated, the first OS acquires a request directed to the storage device and data accompanying the request from the request buffer and then updates the request CI register.

14. The computer system according to claim 13, wherein the first OS acquires, by referring to the buffer address list, location information about the data contained in the buffer address list with the guest physical address, acquires the address translation information, translates the guest physical address to the host physical address, and reads the data using the translated host physical address.

* * * * *